United States Patent [19]

Huber

[11] Patent Number: 5,579,143
[45] Date of Patent: Nov. 26, 1996

[54] OPTICAL SYSTEM WITH TUNABLE IN-FIBER GRATINGS

[75] Inventor: David R. Huber, Warrington, Pa.

[73] Assignee: Ciena Corporation, Columbia, Md.

[21] Appl. No.: 71,263

[22] Filed: Jun. 4, 1993

[51] Int. Cl.$^6$ .................................. H04J 14/02
[52] U.S. Cl. .................. 359/130; 359/127; 385/47
[58] Field of Search .................... 359/114, 124, 359/127, 130, 168–170, 349; 385/10, 15, 18, 24, 37, 47

[56] References Cited

U.S. PATENT DOCUMENTS

| | | | |
|---|---|---|---|
| 5,026,137 | 6/1991 | Tokumitsu | 359/152 |
| 5,107,360 | 4/1992 | Huber | 359/124 |
| 5,115,338 | 5/1992 | DiGiovanni et al. | 359/337 |
| 5,119,447 | 6/1992 | Trisno | 385/3 |
| 5,134,620 | 7/1992 | Huber | 372/6 |
| 5,140,456 | 8/1992 | Huber | 359/341 |
| 5,151,908 | 9/1992 | Huber | 372/6 |
| 5,153,762 | 10/1992 | Huber | 359/125 |
| 5,159,601 | 10/1992 | Huber | 372/6 |
| 5,166,821 | 11/1992 | Huber | 359/181 |
| 5,187,760 | 2/1993 | Huber | 385/37 |
| 5,191,586 | 3/1993 | Huber | 372/6 |
| 5,200,964 | 4/1993 | Huber | 372/26 |
| 5,208,819 | 5/1993 | Huber | 372/32 |
| 5,210,631 | 5/1993 | Huber | 359/132 |
| 5,210,633 | 5/1993 | Trisno | 359/194 |
| 5,222,089 | 6/1993 | Huber | 372/26 |
| 5,231,529 | 7/1993 | Kaede | 359/124 |
| 5,243,609 | 9/1993 | Huber | 372/19 |
| 5,257,124 | 10/1993 | Glaab et al. | 359/124 |
| 5,257,125 | 10/1993 | Maeda | 359/196 |
| 5,260,823 | 11/1993 | Payne et al. | 359/341 |
| 5,268,910 | 12/1993 | Huber | 372/6 |
| 5,271,024 | 12/1993 | Huber | 359/130 |
| 5,283,686 | 2/1994 | Huber | 359/337 |

Primary Examiner—Leslie Pascal
Attorney, Agent, or Firm—William L. Feeney; Margaret A. Burke

[57] ABSTRACT

An optical cable television system provides a large channel capacity and uses shared resources, whereby the more expensive hardware is shared over a large number of customers so as to minimize the cost per customer. A video switch network is provided which minimizes the temptation of subscribers to pirate signals since pay per view or on demand signals are provided only upon request of someone within a node corresponding to a neighborhood. An on demand program center continuously plays programs, such as movies, at time-staggered starts such that any subscriber will have only very minimal delays before seeing a particular program which is requested. A tuneable optical filter is provided in order to switch video signals onto an optical fiber going to the node in a particular neighborhood. An arrangement uses in-fiber grating in order to remove and insert different optical frequencies. Local insertion of various program sources, such as local commercials, is accomplished effectively by making such insertion at a relatively high point in the video distribution chain. An interface arrangement to provide on demand video signals to telephone company twisted pair wires is utilized.

20 Claims, 18 Drawing Sheets

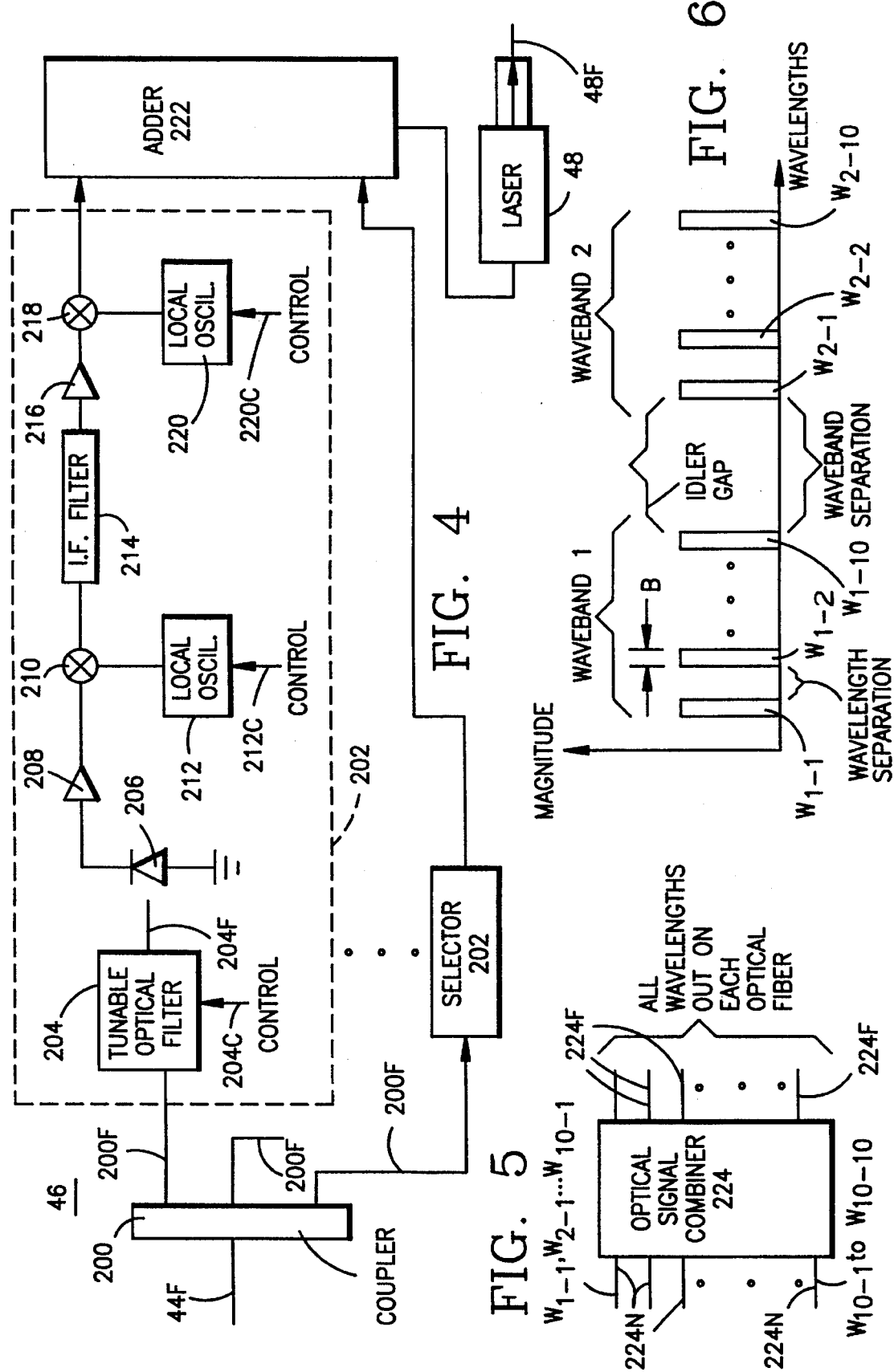

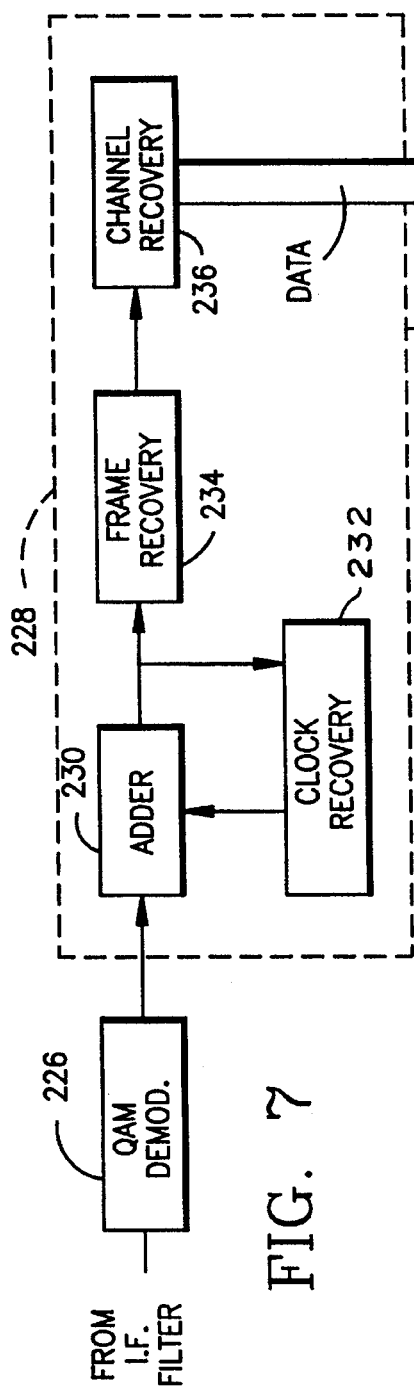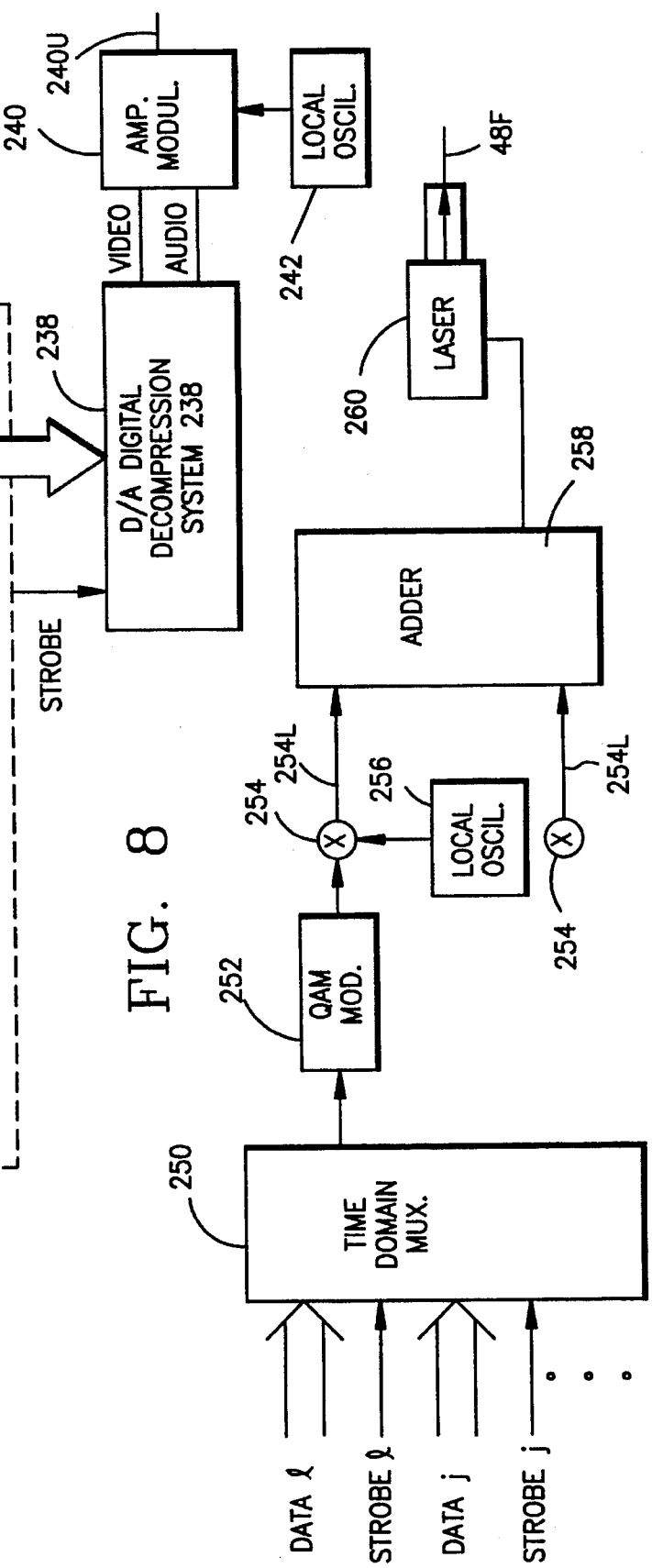
FIG. 7
FIG. 8

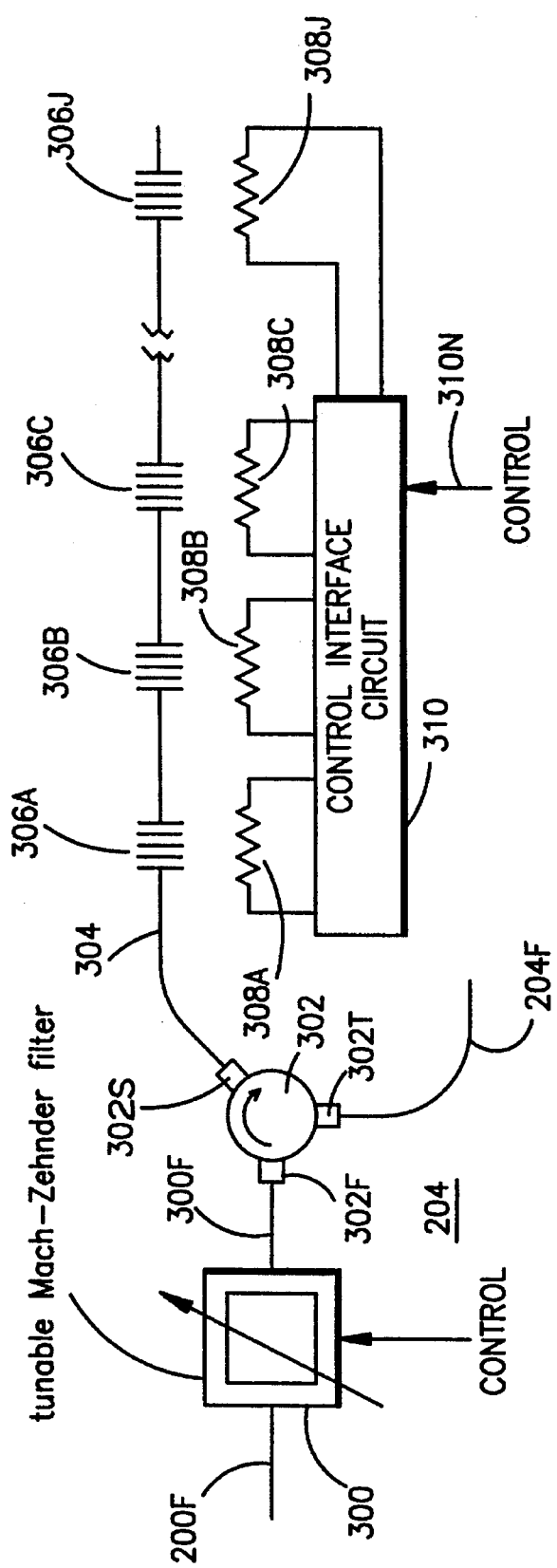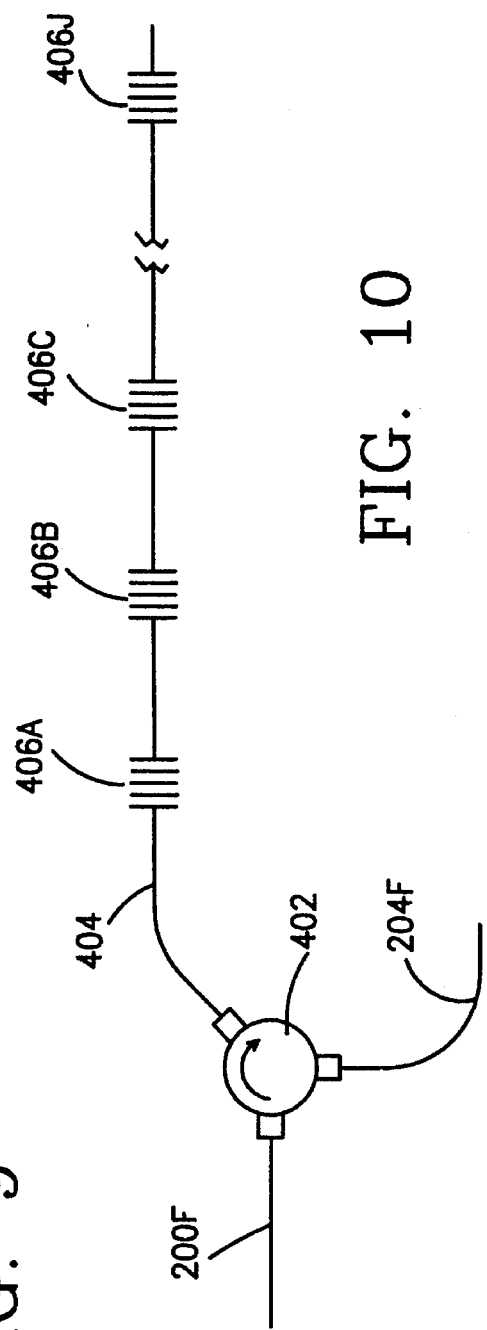
FIG. 9
FIG. 10

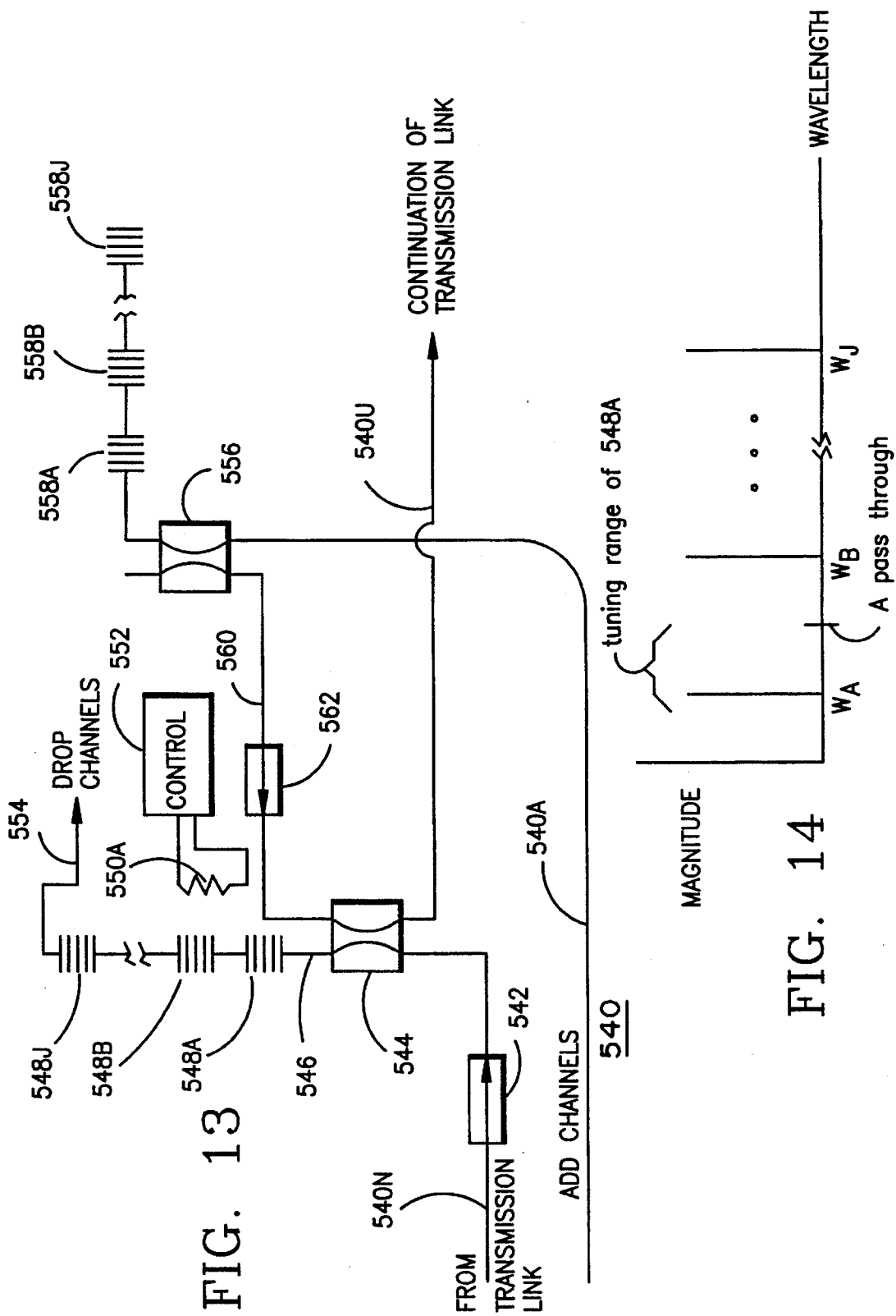

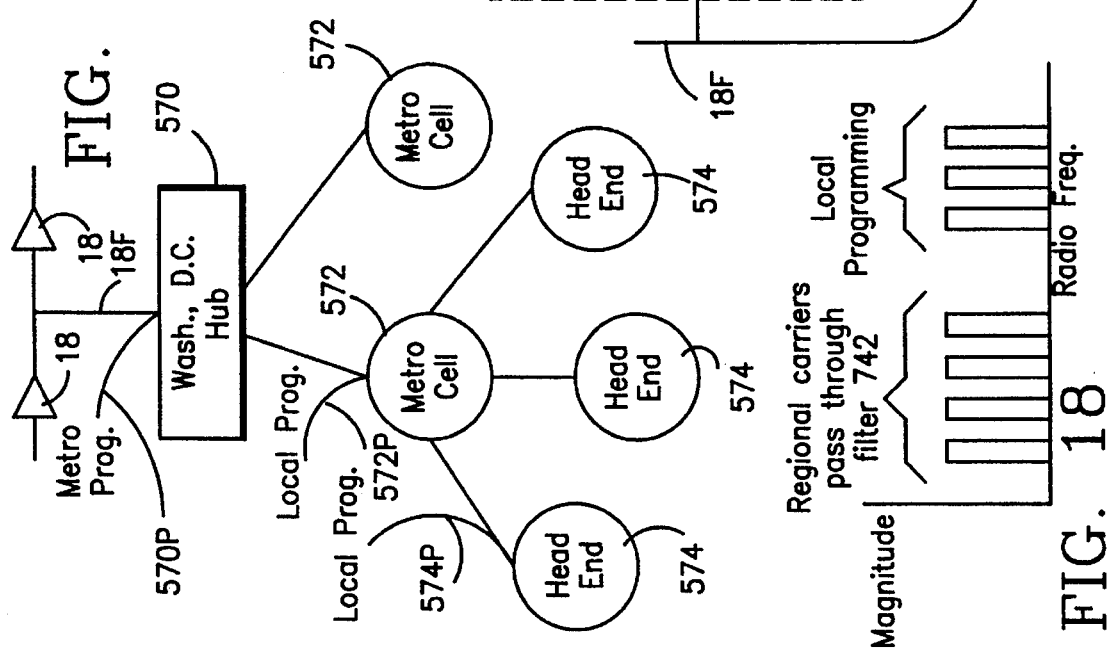

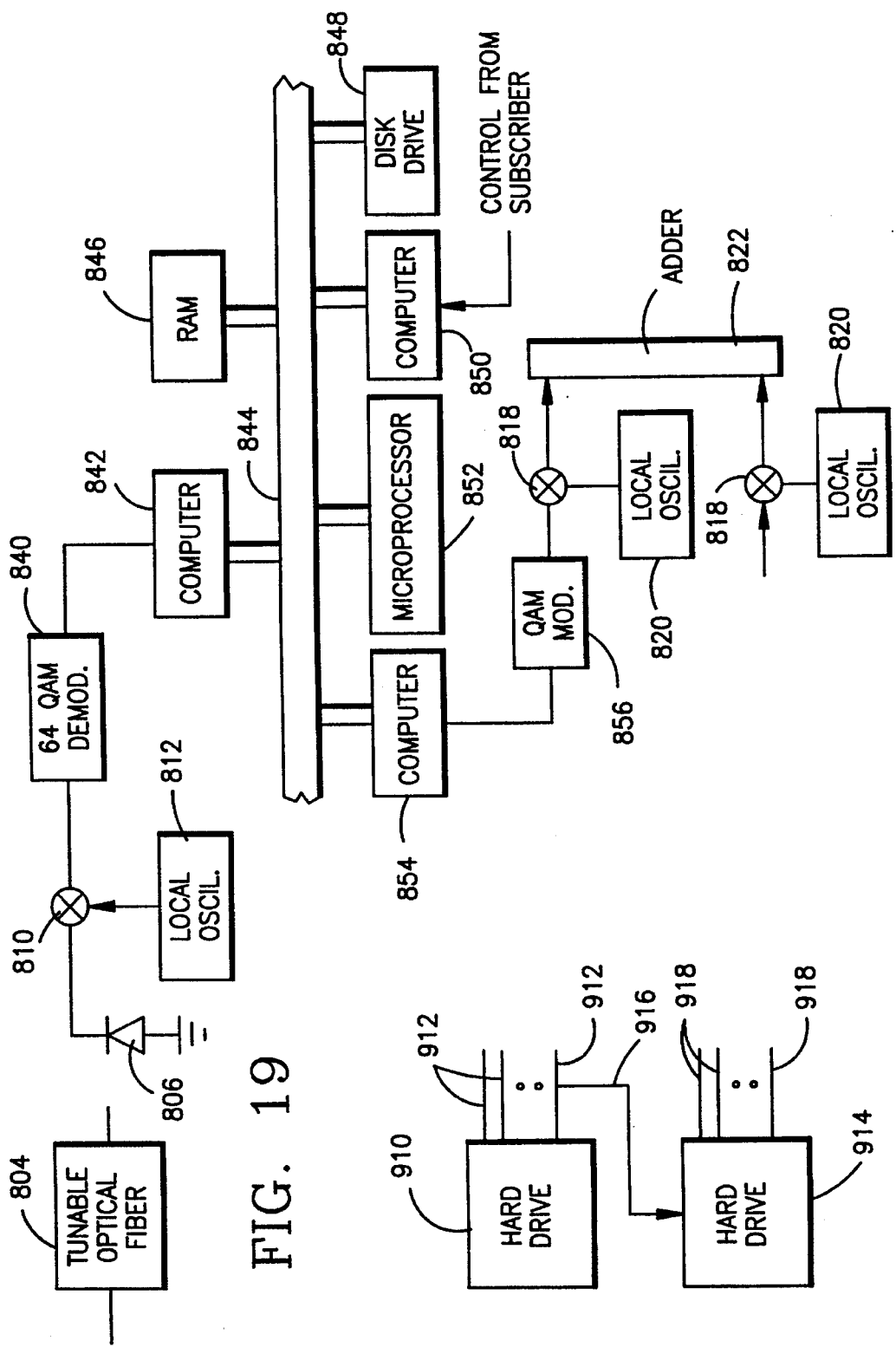

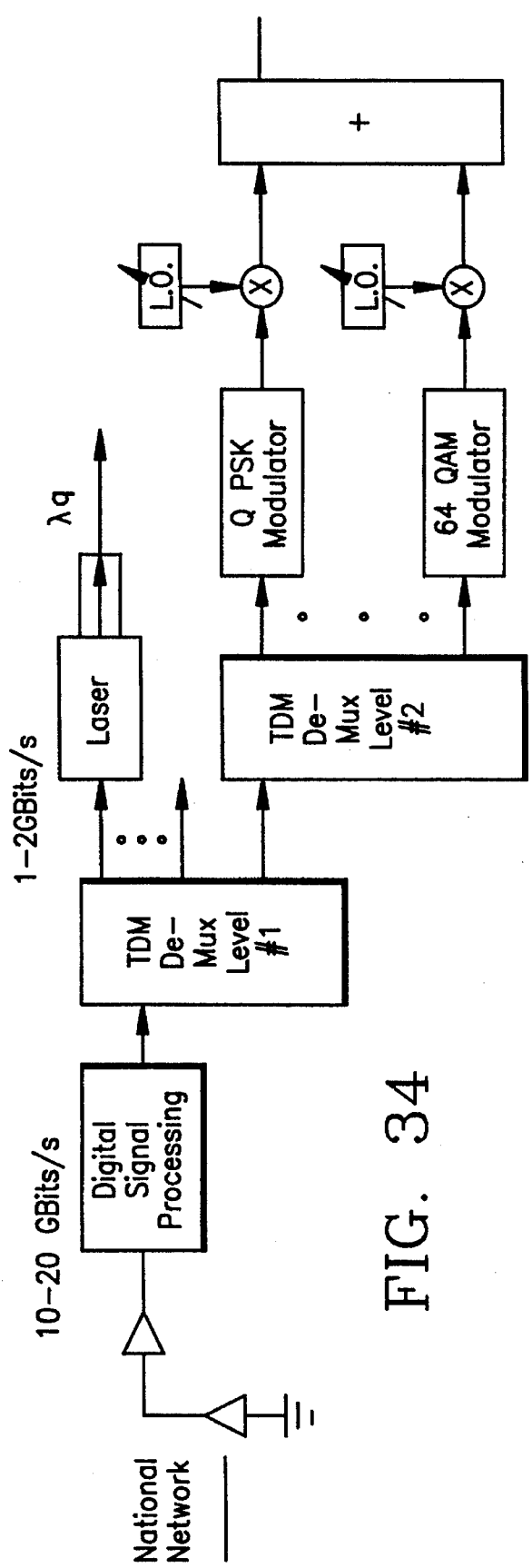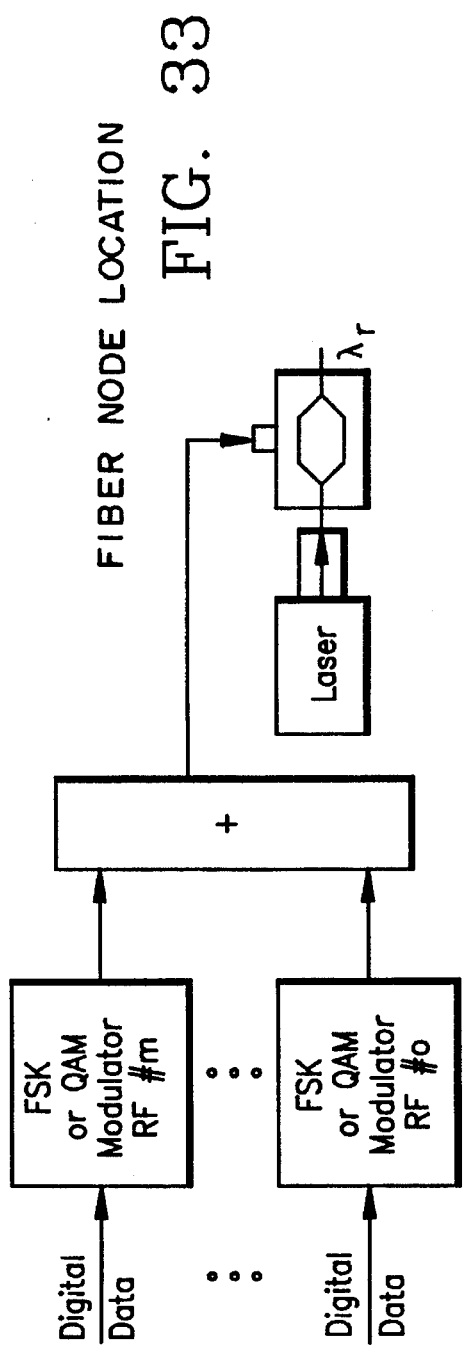

OPTICAL SYSTEM WITH TUNABLE IN-FIBER GRATINGS

BACKGROUND OF THE INVENTION

The present invention relates to an optical cable TV system.

Various cable TV systems, often called CATV, have been used for delivery of video signals to customers. Such cable TV systems have generally used coax cable to carry the video signals. Generally, such cables are limited to carrying 100 or fewer channels or video signals.

In an effort to increase the channel capacity of cable TV systems, various proposals have been made to send the video signals along optical fiber cables. Although such designs provide increased channel capacity beyond that of coax cable, channel capacity is still more limited than is desirable.

Apart from limitations on the channel capacity of cable TV systems, various other problems and constraints are generally present in cable TV systems.

Cable TV systems often use a relatively large number of amplifiers which are staggered along a trunk line in order to provide cable TV service. For example, there may be as many as seven amplifiers along a trunk line. Since each amplifier introduces at least some distortion, the quality of the video signal for those customers at the output of the seventh amplifier is much lower than the quality of the video signal for those customers closer to the beginning of the chain of amplifiers. Additionally, the failure of one of the amplifiers near the beginning of the chain will cause a loss of service for all customers further down the chain. If the first or second amplifier in the trunk line goes out of service, a very large number of customers will lose their cable TV service until repairs can be made.

Various designs have been used to provide on demand video services, often called pay per view. Although such services have been useful in allowing customers to customize the shows which they want to watch, present on demand features have certain disadvantages. Generally, such on demand or pay per view features provide the customer with a scrambled signal and the customer can watch the on demand or pay per view signal only if the customer signals the cable system that he or she wishes to watch the on demand signal. The cable TV system then usually sends data to the cable TV box at the viewer's house such that the cable TV box now unscrambles the signal. Since the signal is generally sent to the viewer's house whether the viewer has paid for it or not, there is a significant number of viewers who will buy descramblers or otherwise make efforts to view the program without paying for it. Such viewing of pirated pay per view or on demand video signals is a serious problem in the cable TV industry. Further, such an arrangement requires a descrambler, controllable by the cable TV company, within the cable TV box of all viewers. This increases the cost of equipment for the cable TV company, especially considering that a relatively sophisticated descrambler is needed at the customer's cable TV box to try to minimize the risk that the customer will buy or build their own descrambler in order to pirate the pay per view signals.

Generally, the need for various components, such as descramblers, associated with each cable TV box at the customer's home, increases the cost of hardware which must be provided by the cable TV company. On the other hand, it has not been practical generally to move some of the more sophisticated switching or descrambling components out of the customer's cable TV box since moving those components to a more central location would usually interfere with the ability of the customer to custom select features which he or she wishes to view.

Although various systems have been developed on cable TV to provide movies in response to customer's selections, such on demand or pay per view programming has been quite limited in flexibility. For example, if the viewer wishes to watch a pay per view movie when sitting down for television at 8:40 at night, the viewer may be discouraged to learn that the pay per view movie which he or she was interested in started at 8:30. The customer then must start the movie 10 minutes late, wait until the next showing at 10:30, or simply forget about watching the pay per view movie that night. Since such movies or other pay per view video signals are shown only at a relatively limited number of times, the viewer must accommodate the cable TV system instead of the other way around.

A problem with various optical cable TV systems is a difficulty in providing adequate filtering which will filter out undesired optical signals with a high degree of rejection, while passing a desired optical signal. If one is to use an optical fiber for carrying video signals on different wavelengths of laser light, one must have a tuneable optical filter (difficult to achieve satisfactorily) in order to select the wavelength of laser light corresponding to the desired signal or one must have a plurality of dedicated optical filters (each optical filter dedicated to a single wavelength) and an arrangement for selecting from the outputs of the different dedicated optical filters. In either case, complexity, high cost, and other difficulties have generally been encountered.

Cable TV systems often provide arrangements whereby one can block transmission of a signal such that a local signal can be inserted. For example, if a nationwide cable channel is provided to various local cable TV systems, such local cable TV systems want to be able to insert local commercials. At designated times in the feed from the nationwide cable channel, blocks of time will be provided for the local cable TV company to insert a local commercial. Arrangements for removal and insertion of signals upon a channel are often quite complex and expensive. Further, such local insertions often must be made at several locations in order to cover a metropolitan area. This increases the hardware requirements for making such insertions and renders the process more complex.

OBJECTS AND SUMMARY OF THE INVENTION

Accordingly, it is a primary object of the present invention to provide a new and improved optical cable TV system.

A more specific object of the present invention is to provide an improved optical cable TV system having substantially increased channel capacity.

Yet another object of the present invention is to provide an optical cable TV system wherein several of the more expensive portions of the system may be allocated over a relatively large number of viewers so as to minimize the cost per viewer of such expensive hardware components.

Yet another object of the present invention is to provide optical cable TV with an improved resistance to pirating of signals.

A still further object of the present invention is to provide an optical cable TV system which provides substantially improved flexibility in delivering pay per view or on demand video signals.

A still further object of the present invention is to provide an improved tuneable optical filter.

Yet another object of the present invention is to provide for removal and insertion of local commercials or similar local features in a highly efficient and relatively low cost fashion.

A still further object of the present invention is to provide an optical cable TV system which reduces the risk that a single component failure will cause loss of cable services for a large number of customers.

A still further object of the present invention is to provide optical cable TV where customers have very clear signals regardless of where they are located in a distribution chain.

A still further object of the present invention is to provide an optical cable TV system with minimal interference from one channel to another.

More generally, the present invention is designed to minimize or avoid the problems discussed in the background portion of this application.

The above and other objects of the present invention which will be become more apparent as the description proceeds are realized by a cable TV system including an on demand optical fiber bus carrying a plurality of optical wavelengths with on demand video signals. A plurality of video switch networks are used, each connected to the on demand optical fiber bus and including a plurality of parallel signal paths therein. Each signal path has a selector therein for selecting one of the on demand video signals. A plurality of network output optical fibers are provided, each operatively connected to a corresponding one of the video switch networks to carry those on demand video signals selected by the selectors within that corresponding one of the video switch networks. The network output optical fibers extend from a central location remote from subscribers downstream towards the subscribers and carrying the on demand video signals downstream only upon selection by the selectors.

The present invention may alternately be described as a cable TV system having an on demand program center including a plurality of storage means having various video programs stored therein. Means are provided to stagger the start of the video programs such that each video program is started once every time interval T, which time interval is not necessarily the same for each of the video programs. At least one laser is provided in the program center and has a modulator for modulating light from the laser based on one or more of the video programs. An on demand optical fiber bus extending outside of the program center receives the modulated light and carries it to a first downstream distribution level. A video switch network at the first downstream distribution level is connected to the on demand optical fiber bus. A network output optical fiber is operably connected to the video switch network and extends to a second downstream distribution level, further downstream than the first distribution level and remote from subscribers. The video switch network applies signals corresponding to the video programs only upon subscriber request.

The present invention may further be described as a tuneable optical filter including a directional optical transfer device. A first optical fiber carries a plurality of optical carriers to the transfer device. A second optical fiber is connected to the transfer device for receiving the plurality of optical carriers. A plurality of tuneable in-fiber gratings are disposed in the second optical fiber. Controllers for tuning each of the gratings allow reflection of a desired optical carrier back to the transfer device. A third optical fiber is connected to the transfer device for receiving optical carriers reflected back to the transfer device by the gratings.

The present invention may alternately be described as a remove and insert system for removing and inserting optical carriers including a first directional optical transfer device. A first optical fiber carries a plurality of optical carriers to the first transfer device. A second optical fiber is connected to receive the plurality of optical carriers. A plurality of tuneable in-fiber gratings are in the second optical fiber. Controllers are provided for tuning each of the gratings to reflect desired optical carriers back to the first transfer device. A third optical fiber is connected to the transfer device for receiving optical carriers reflected back. A fourth optical fiber is connected by an isolator to a second directional optical transfer device, the isolator blocking signals from passing from the first transfer device to the second transfer device. A fifth optical fiber is connected to the second transfer device and has optical carriers corresponding to one or more optical carriers not supplied to the third optical fiber due to non-reflection from the gratings of the first transfer device. A sixth optical fiber is connected to the second transfer device and has a plurality of in-fiber gratings therein for reflecting optical carriers to be added to the third optical fiber. Controllers are provided for controlling each of the gratings in the sixth optical fiber.

The present invention may alternately be described as an optical cable TV system including a metropolitan hub and a plurality of metropolitan cells downstream from the hub and connected by optical fiber thereto. A plurality of head ends are downstream from each of the cells and are connected by optical fiber thereto. Insertion networks insert local programming are provided at a higher distribution point than necessary for a distribution zone for the local programming which is to be inserted.

The present invention may alternately be described as a system for applying on demand video signals to a telephone twisted pair for distribution. A tuneable optical filter is used for selecting an optical carrier having a desired program. Means receive the optical carrier and provide an electrical output based thereon. A demodulation system demodulates the electrical output. A telephone modulator modulates the demodulated output in telephone format. A switch network selectively applies signals from the telephone modulator to one or more of a plurality of twisted pairs connected to the switch network.

BRIEF DESCRIPTION OF THE DRAWINGS

The above and other features of the present invention will be more readily understood when the following detailed description is considered in conjunction with the accompanying drawings wherein like characters represent like parts throughout the several views and in which:

FIG. 4 shows a video switch network according to the present invention;

FIG. 5 shows a combined which may be used in place of a coupler in the arrangement of FIG. 4;

FIG. 6 shows various optical wavelengths and is used for explaining the operation of FIG. 5;

FIG. 7 shows a modification of a selector portion of the arrangement of FIG. 4;

FIG. 8 shows a further alternate modification for the selector portion of FIG. 4;

FIG. 9 shows a first embodiment of a tuneable optical filter according to the present invention;

FIG. 10 shows a second embodiment tuneable optical filter according to the present invention;

FIG. 13 shows a remove/insert arrangement according to the present invention;

FIG. 14 is a wavelength diagram illustrating some of the principles of operation of the arrangement of FIG. 13;

FIG. 15 shows a simplified view of a portion of the structure of the distribution network;

FIG. 16 shows an arrangement for insertion of different video signals than those from a primary source;

FIG. 17 shows an insertion network and related components which may be used to insert local programming;

FIG. 18 shows various radio frequencies indicating the allocation of those frequencies for a particular aspect of the present invention;

FIG. 19 shows portions of a modified video switch network providing various computer functions to a subscriber;

FIG. 23 is a modification of a portion of the program center of FIG. 20; and

FIG. 33 shows a technique for placing digital information on fibers;

FIG. 34 shows how video phone and digital data from the home of a subscriber may be sent to a regional bus; and FIG. 35 shows a system for processing data generated within a metro cell so it is applied to the national network.

DETAILED DESCRIPTION

Figure 1:
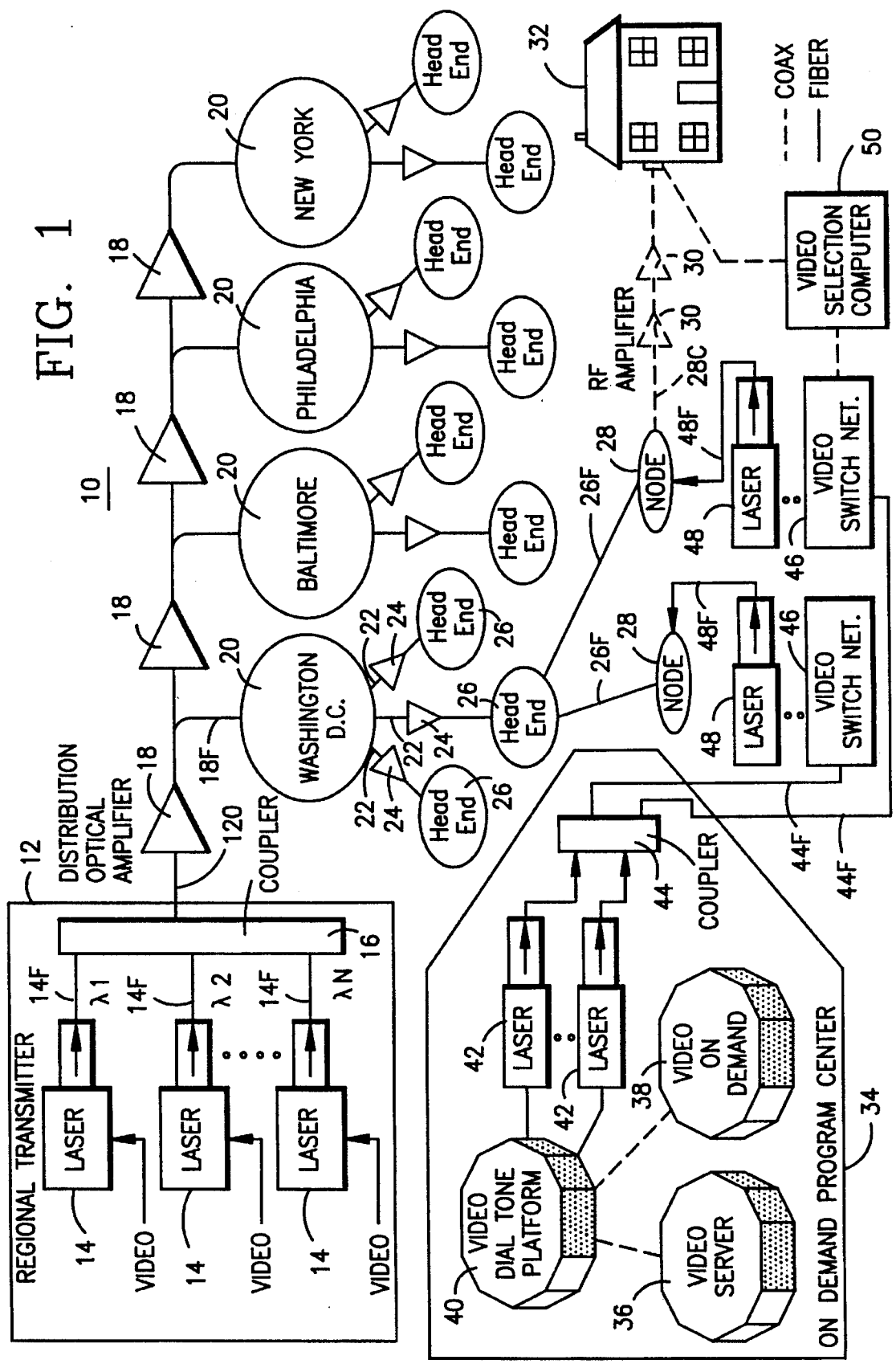
FIG. 1 shows an optical cable TV system according to the present invention.

Turning now to FIG. 1, a simplified block diagram shows an optical cable TV system 10 according to the present invention. A regional transmitter 12 uses lasers 14, only three of which are shown for simplicity, and optical coupler 16 to provide various video signals or channels on output optical fiber 12U. The coupler 16 simply uses known technology to combine the N different wavelengths corresponding to the N different lasers 14, the laser energy being supplied to coupler 16 on optical fibers 14F. As will be discussed in more detail below, each of the video inputs indicated for the lasers 14 may carry signals corresponding to a relatively large number, such as 3,000 different video signals or channels. The output from the regional transmitter or hub 12 is fed along optical fiber 12U to pass sequentially through distribution optical amplifiers 18 having various optical fibers extending therebetween and having optical signal splitters (not separately shown) separating out from the optical fibers between the various amplifiers 18 in order to go to the various metropolitan hubs 20 corresponding to different metropolitan areas. The optical signals received on the optical fiber by each metropolitan hub is sent, still in optical form, along various optical fibers 22 to optical amplifiers 24 and on to head ends 26. For ease of illustration, only some of the optical fibers 22, amplifiers 24, and head ends 26 are labeled. The head end 26 splits the optical signals for feeding along a plurality of optical fibers 26F to a plurality of neighborhood nodes 28. For ease of illustration, only two of the optical fibers 26F are shown and only two nodes 28 are shown. However, it will be understood that significantly more than two of the optical fibers 26F extend to corresponding significant numbers of nodes 28 from each of the head ends 26. Each of the head ends 26 would have a plurality of the nodes 28 connected to it, each node corresponding to a particular neighborhood with, for example, between 500 and 2,000 subscribers. The node 28 converts the optical signals on optical fiber 26F to electrical form for coax distribution. As shown just to the right of the right-most node 28 in FIG. 1, the resulting radio frequency signals are fed along coax 28C to RF amplifiers 30 to a subscriber's home 32. Although the signal is shown passing through two RF amplifiers 30 before reaching the subscriber's house 32, other houses (not shown) connected to the same node 28 may have signals which pass to the houses without passing through the two amplifiers. Advantageously, the use of separate optical fibers 26F connecting each node 28 to the corresponding head end 26 avoids the need for a plurality of distribution amplifiers in that portion of the path. Thus, none of the nodes 28 are further out on the distribution chain from head end 26 than any of the other nodes 28 and customers at any of the nodes 28 should have a picture of substantially the same clarity.

An on demand program center 34 may also be used to supply on demand or pay per view type programming to the various nodes 28. The on demand program center 34 includes a video server 36, video on demand block 38, and video dial tone platform 40, all of which may work in known fashion using known components except that they may incorporate certain highly advantageous features which will be discussed in more detail below.

Video signals from the video dial tone platform 40 are supplied to lasers 42, only two of which are shown. The outputs of the lasers 42 are fed to a coupler 44 having various output optical fibers 44F, only two of which are shown. Each of the output optical fibers 44F carries all of the signals entering the summer 44 through the different optical fibers from the lasers 42. Each of the optical fibers 44F proceeds towards a corresponding node 28 by way of several intermediate components. In particular, each of the optical fibers 44F goes to a video switch network 46. The details of the video switch network 46 will be discussed below. Each of the optical fibers 44F carry all of a very large number of signals. The video switch network selects a significantly smaller number of the signals to proceed by coax to modulate laser 48. The video switch network 46 has converted the video signals from their optical form on optical fibers 44F such that coax is used to provide the same signals to lasers 48. The lasers 48 then supply the selected video signals, in optical form, to node 28. Although the video switch networks 46 and lasers 48 might be located at the node 28, it is more preferable to have them located at the same physical location as the head end 26. Although the arrangement of FIG. 1 shows the optical fibers 44F proceeding directly from summer 44 to the video switch networks 46, one could alternately feed the output of summer 44 through a distribution chain similar to the distribution chain of amplifiers 18 and hubs 20 shown with respect to the output of summer 16. Additionally, if desired, the outputs of lasers 42 could be supplied to the summer or signal combiner 16 for distribution along optical fiber 12U and the distribution chain downstream thereof. In that case, the various head ends 26 might have some arrangement to separate out the on demand signals so that only the signals requested by subscribers within a particular neighborhood node 28 would be sent to that neighborhood node 28.

Regardless of the various possibilities for distributing the video signals from program center 34 discussed above, a key feature is that the on demand or pay per view programming is not supplied to the subscriber's house 32 unless someone in his neighborhood has requested the particular on demand or pay per view video signal. In other words, the video switch network 46 only supplies programs to a particular node 28 if someone within that node has indicated a request for the particular on demand or paid per view program. Since other subscribers within a particular neighborhood corresponding to node 28 will not be certain which program is on which frequency and which program has been ordered, the motivation for piracy will be greatly reduced. A subscriber in a particular house 32 is significantly less likely to try to pirate a video signal if he simply does not know what will be on the signal. Therefore, relatively well known and inexpensive blocking arrangements (not shown) can be used to block the pay per view or on demand programming from reaching customers within the neighborhood corresponding to node 28 when their neighbor within that node has selected a particular program. A video selection computer 50 is used to control the video switch network 46 and is connected by coax to the subscriber's home 32 and the video switch network 46. Preferably, there would be one video selection computer 50 for each of the video switch networks 46 (although only one selection computer 50 is shown) and the selection computer 50 would be connected to all subscriber's homes in a particular neighborhood corresponding to the node 28. When the subscriber in home 32 wishes to view a particular program, the video selection computer is signalled by the subscriber using a key pad or other input means (not shown). The selection computer 50 then causes the corresponding video switch network 46 to pass the appropriate video signals through to the corresponding laser 48.

Figure 2:
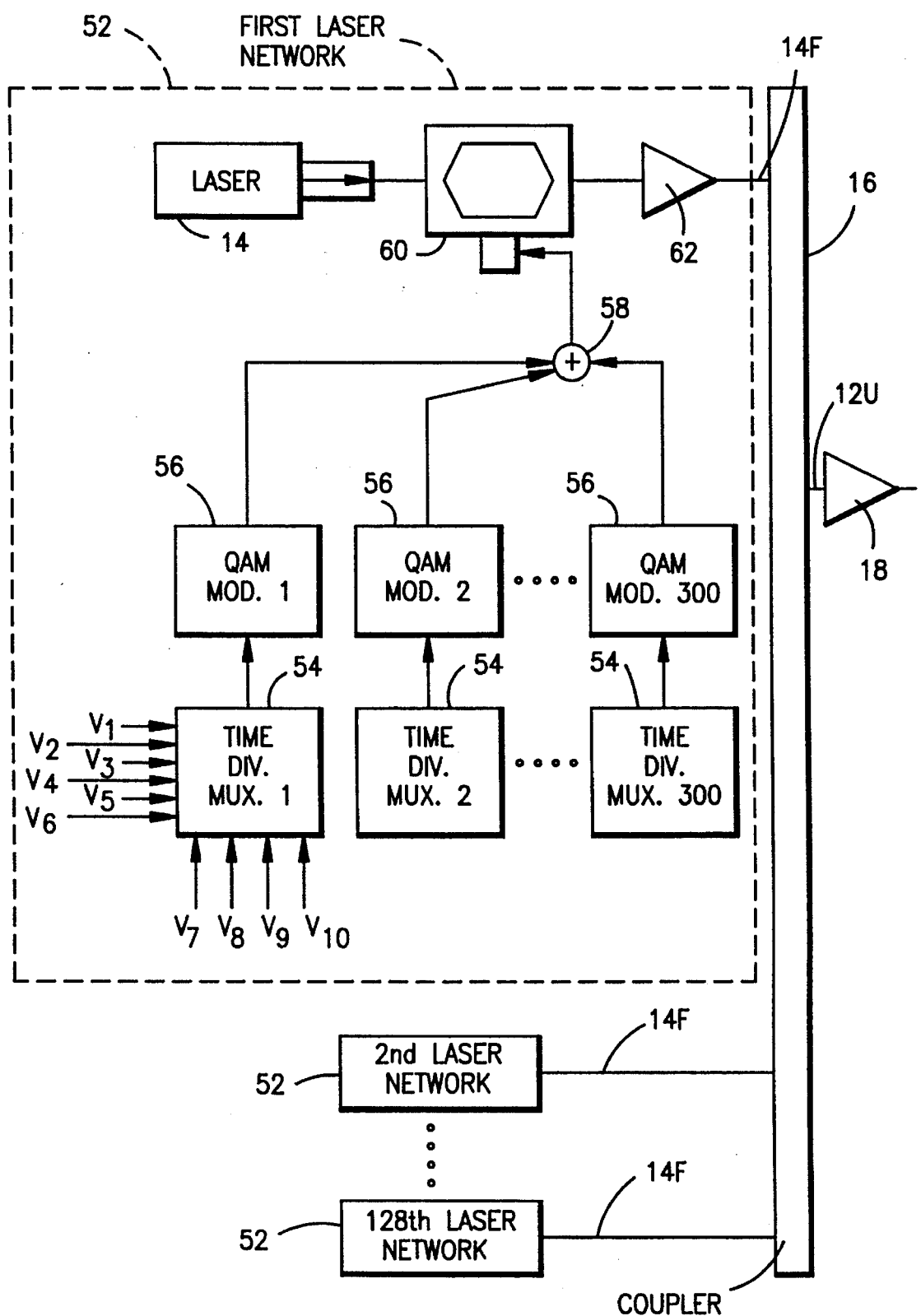
FIG. 2 shows more details of a regional transmitter portion of the system of FIG. 1.

Turning now to FIG. 2, more of the details of the regional transmitter 12 will be shown including components left out of FIG. 1 for ease of illustration. As shown in FIG. 2, a relatively large number of laser networks 52 provide optical signals on optical fibers 14F to the coupler 16. The laser networks 52 provide video signals on optical fibers 14F at different wavelengths, each laser network 52 corresponding on a one-to-one basis with a particular optical wavelength. Each of the laser networks 52 may be identically constructed in a fashion which will be illustrated with respect to the first laser network. There may be as many as 128 laser networks 52 as illustrated. Each of the laser networks 52 may provide 3,000 video channels or signals on its corresponding optical fiber 14F. However, if desired, some of the laser networks 52 may provide various supervisory data (not separately shown) on the corresponding optical fibers 14F.

Turning to the details of the first laser network 52, network 52 includes 300 time division multiplexors 54, each of which receives 10 different video input signals such as $V_1$ through $V_{10}$ as illustrated with respect to the left most time division multiplexor 54. Since 10 different video signals are provided to each of the 300 multiplexors 54, 300 channels or video signals are provided in total to the various time division multiplexors 54 within a particular laser network 52. The 10 video signals, received in electrical form by the time division multiplexors 54 are multiplexed and passed along, still in electrical form, by wire to corresponding quadrature amplitude modulation modulators 56. Preferably, each of the modulators 56 uses 64 QAM. The outputs of the 300 different modulators 56 are 300 different radio frequency carriers, each having 10 video signals impressed thereon. Those radio frequency carriers are supplied by wire from modulators 56 to an adder 58 which combines the different inputs. The output of adder 58 is supplied to an optical modulator 60, which may be an interferometer. Accordingly, the 3,000 different video signals for the particular laser network 52 are used to modulate the output of laser 14. The output of optical modulator 60 is supplied to an optical amplifier 62 before proceeding to the coupler 16.

Different video signals would be supplied to each of the laser networks 52. The same 300 different radio frequency carriers may be used by the 300 modulators 56 within each of the laser networks 52 since those RF carriers will be used to modulate different optical wavelengths in the respective different laser networks 52. Accordingly, it will be appreciated that a huge number of channels or video signals may be supplied on optical fiber 12U.

Figure 3:
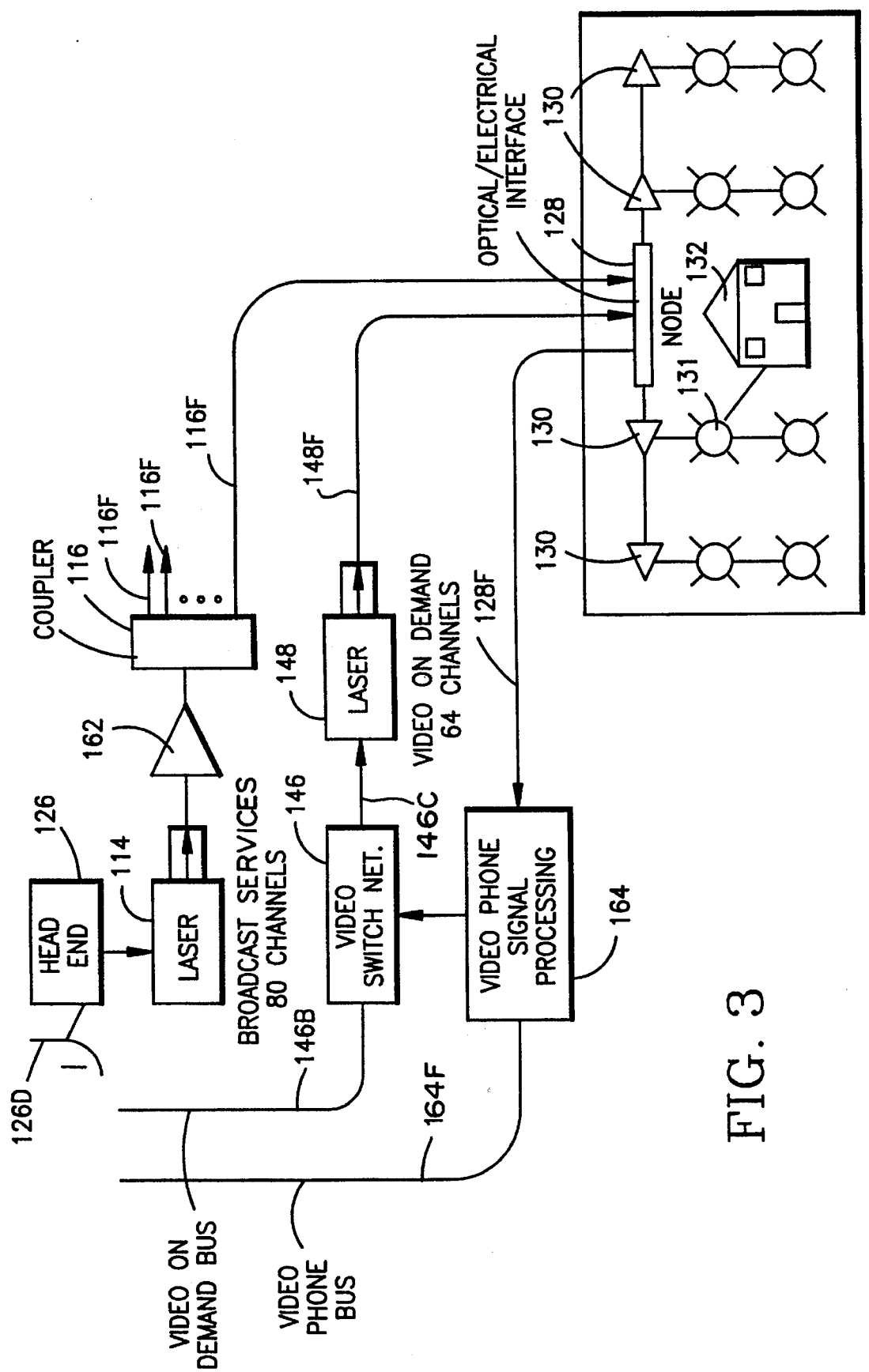
FIG. 3 shows a portion of an alternate system from that of FIG. 1.

Next turning to FIG. 3, there is shown a simplified view of an alternate to the structure of FIG. 1. For ease of discussion, components in the FIG. 3 arrangement have the same last two digits as the corresponding component, if any, in the arrangement of FIG. 1. In FIG. 3, the node 128 corresponding to a particular neighborhood converts video signals in optical form to electrical form for proceeding along coax cables to amplifiers 130 and houses 132 by way of taps 131. As illustrated, the node 128 is connected by optical fiber 128F to a video phone signal processing network 164. The signal processing network 164 may provide video phone and voice phone by optical fiber 164F. Additionally, a video selection computer (not shown in FIG. 3) may be disposed within processing block 164 and used to control the video switch network 146 as discussed previously with respect to the video switch network 46 of FIG. 1. If a customer in a particular house 132 wants to view a particular on demand or pay per view feature, the subscriber uses a telephone key pad, dedicated keyboard, or other control (not shown) to supply a request by way of node 128 to signal processing block 164 which in turn causes the video switch 146 to pass selected video signals from a video on demand optical fiber bus 146B (containing one or more optical fibers) to modulate a laser 148 (separate modulator not shown) by way of a coax cable 146C. The laser 148 supplies the selected video signals, in optical form, to an optical fiber 148F which proceeds to the node 128. Since the video switch 146 and laser 148 are located remotely from the subscriber's home 132, there is significantly less incentive for a subscriber to try to pirate signals because the subscriber will be unaware of which signals would be supplied at a particular time. If the subscriber's neighbor selects a pay per view sporting event, it would be supplied to the subscriber's house 132. However, the subscriber would not know what channel it was on, and would not normally know if the neighbor had even ordered the sporting event. He would therefore be significantly less inclined to try to pirate the signal. Under those circumstances, very simple known arrangements (not shown) could be used to insure that only the person paying for the sporting event or other on demand or pay per view video signal was able to decode that signal. In other words, the large number of channels and uncertainty over what signals were coming into the subscriber's house means that any blocking arrangement within the subscriber's house can be relatively inexpensive without fear of major piracy problems.

The arrangement of FIG. 3 is different than FIG. 1 also in that head end 126 may receive various broadcast signals by satellite dish 126D. The broadcast signals are supplied by wire to a laser 114. Although not shown, the video signals from head end 126 may be impressed upon the laser energy from laser 114 using the same techniques as shown with respect to the first laser network 52 of FIG. 2. The output of laser 114 is fed to an optical amplifier 162 for passage to a coupler 116. The coupler 116 is different than coupler 16 of FIG. 1 in that coupler 116 has a plurality of optical fibers 116F extending therefrom. Each of the optical fibers 116F would go to a different node 128, although only one node 128 is shown in the drawing for simplicity. Likewise, the other nodes 128 which are not shown would have separate video switches 146, lasers 148 and video phone signal processing networks 164 corresponding to them.

With reference now to FIG. 4, the details of the video switch network 46 of FIG. 1 will be explained, it being understood that video switch network 146 of FIG. 3 is identically constructed. The various video signals, in optical form, on optical fiber 44F are provided to a coupler 200 which provides optical outputs on optical fibers 20OF, all of which are identical to the optical signals on the input optical fiber 44F. Referring back momentarily to FIG. 1, and considering that the video signals may be impressed on the laser energy from lasers 42 in the same fashion as shown with respect to the first laser network 52 of FIG. 2, there may be over 100 different optical wavelengths on optical fiber 44F and all of those optical wavelengths would be supplied to the optical fibers 200F. A selector 202 receives the over 100 optical wavelengths. Each of the optical wavelengths on optical fiber 200F may carry 3,000 channels or video signals in the fashion described with respect to first laser network 52 of FIG. 2. Each of the selectors 202 is used to select one of the video signals or channels from among the over 300,000 channels (it might be more or less) provided on optical fiber 200F. For ease of illustration, the details of selector 202 are given for only one of the selectors 202. Additionally, only one other of the selectors 202 is shown. However, in practice a relatively large number of selectors 202 would be used. For example, if experience shows that a neighborhood might have subscribers asking for 64 pay per view or on demand video signals or channels at a particular time, there would be 64 of the selectors 202, each receiving identical optical inputs on the optical fibers 200F.

The selectors 202 essentially partially reverse the process discussed with respect to the first laser network 52 and coupler 16 of FIG. 2. Initially, a tuneable optical filter 204 selects a single one of the wavelengths corresponding to the channel or video signal which a subscriber in the neighborhood of the node corresponding to video switch 46 wishes to view. As mentioned, there may well be over 100 of the optical wavelengths supplied by each of the optical fibers 200F. If a subscriber in the neighborhood selects a channel or video signal which is carried by the third wavelength, the video selection computer 50 (refer back momentarily to FIG. 1) supplies a signal on control line 204C such that optical filter 204 will allow passage of the third wavelength through to optical fiber 204F. The optical filter 204, which is a band pass optical filter, will be described in more detail below. At this stage, it is sufficient to note that the optical filter 204 rejects all of the wavelengths of laser energy except the particular one, such as the third wavelength, which is carrying the channel or video signal requested by the subscriber. The selected wavelength of laser energy is supplied to photodiode 206 from which the up to 3,000 channels or video signals are fed in electrical form to an amplifier 208. The output of amplifier 208 is fed to a multiplier 210 for multiplication with a radio frequency signal from local oscillator 212. The tuneable local oscillator 212 provides a radio frequency corresponding to the radio frequency which is carrying the desired channel or video signal. Specifically, a control 212C is used to control the local oscillator 212, using known technology, such that the output of multiplier 210 corresponds to the 10 channels on the radio frequency selected by local oscillator 212. The control 212C setting that frequency would be connected to the video selection computer 50 (FIG. 1 only). The output of multiplier 210 is supplied to an intermediate frequency filter and from there on to amplifier 216. The output of amplifier 216 is supplied to a multiplier 218 which also receives a signal from local oscillator 220 as set by control 220C (from the video selection computer 50 of FIG. 1) and are part of a superhetrodyne detection arrangement. Although the arrangement could demultiplex to select one out of the 10 time division multiplexed signals supplied, such TDM demultiplexing would preferably be done at the subscriber's set top cable box. The output of multiplier 218 is supplied to an adder 222. Each of the selectors 202 is part of a corresponding parallel signal path going from coupler or splitter 200 to the adder 222. Each of the parallel signal paths selects one of the channels for passage to the adder 222. If desired, more than one of the optical fibers 44F (not shown) could be used to supply different couplers 200 (only one shown). In that case the optical fibers 44F might carry different signals and supply different selectors 202 by way of different couplers or signal splitters 200. The different optical fibers 44F could be part of a video on demand bus such as bus 146B of FIG. 3. In the case where a plurality of optical fibers 44F carry different signals, the selectors 202 would be limited to selecting from among the signals supplied to them by the corresponding coupler 200. However, the outputs from all of the selectors 202 could be supplied to the same adder 222. The output of the adder 222 may be used to modulate the output of laser 48 on optical fiber 48F. This is shown in simplified form as various modulation arrangements, such as those shown and discussed with respect to FIG. 2, could be used. If desired, simpler modulation techniques could be used depending upon the number of channels or video signals which will be supplied out of the adder 222.

Again referring to the example where there would be 64 of the selectors 202 for a particular video switch 46, each of the selectors 202 would output a particular video signal or channel requested by someone within the neighborhood corresponding to that video switch. By modulating 64 different radio frequencies with the 64 video inputs, the resulting 64 modulated radio frequency signals could be combined and used to modulate the light from laser 48.

By having the video switch network 146 of FIG. 3 with its associated optical and radio frequency tuning arrangements at the head end location or central switching location in the cable TV system, significant equipment cost is reduced. This arrangement allows resource sharing in that an individual subscriber may use one of the channel selector structures 202 of FIG. 4 to pull in or receive any program from the video on demand bus 146B of FIG. 3. The individual subscriber can have that program placed upon optical fiber 148F and delivered to the node 128 in his neighborhood. Since the optical and radio frequency tuning and the time switching functions are maintained at the head end, these resources are time-shared by a large number of consumers or subscribers. An example using specific numbers may be useful in explaining this. If a node corresponds to 500 different subscribers or households, one would require 500 different units like selector 202 in order to provide all the subscribers with the access to such a large number of channels as the present system provides. Assuming that the system anticipated a peak usage of about 10% for the on demand channels, the present arrangement would allow 50 of the selectors 202 to be located at the head end or central switching office so that 10% of the 500 subscribers could be watching on demand signals at any one time. Therefore, the cost associated with the hardware of selector 202 is reduced to one tenth of what it would otherwise be by virtue of its location at the head end or central switching office. In addition to the substantial savings in the capital cost of the selectors 202, installation and maintenance are significantly less expensive when the equipment, especially the more sophisticated equipment, is installed at the head end or central switching location.

The node 128 of FIG. 3 may simply be a photodiode which receives optical energy from optical fibers 116F and 148F and supplies the output to a radio frequency amplifier. In that case, it is important to note that the laser 114 and laser 148 should operate at different optical wavelengths. Additionally, the radio frequency subcarriers that are used by laser 114 and laser 148 should be mutually exclusive to prevent interference once the signals have been changed from the optical domain into the radio domain.

With respect to the video phone signal processing box 164 and the video phone bus 164F of FIG. 3, it should be noted that the video phone bus would carry signals in both directions such that an amplifier chain (not shown) would be arranged running in both directions. Further, it should be understood that the video phone bus may be carrying data such as personal computer data from a subscriber and may be used for modem personal computer communications. Other data and information could of course be transmitted in either direction.

With reference now to FIGS. 5 and 6, a minor variation for parts of the arrangement of FIG. 4 will be discussed. The signals coming in on optical fiber 44F of FIG. 4 may include 128 different wavelengths. However, for the discussion which follows, it will be assumed that only 100 different wavelengths are used. If 100 wavelengths are used on a single optical fiber such as 44F of FIG. 4, certain distortions may occur in the signal quality depending upon the closeness of the wavelengths and the length of the optical fiber. The arrangement of FIG. 5 uses a plurality of input optical fibers 224N to supply an optical signal combiner 224 having output optical fibers 224F. The output optical fibers 224F will carry all of the wavelengths on each optical fiber and the combiner 224 would be substituted in place of the coupler 200 of FIG. 4. Accordingly, the output optical fibers 224F may lead to selectors 202 similar to that shown in FIG. 4.

The important difference between combiner 224 and coupler 200 is that combiner 224 includes a plurality of input optical fibers 224N each of which only carries a portion of the total wavelengths. In particular, there would be 10 input optical fibers 224N, each of which would carry only 10 of the 100 wavelengths which would be used.

With reference to FIG. 6, the 100 wavelengths which are used could be thought of as 10 wavelengths in each of 10 different wavebands, two of the wavebands being illustrated in FIG. 6. Wave band one includes wavelength $W_{1-1}$, wavelength $W_{1-2}$, through wavelength $W_{1-10}$. It will be recognized that the notation indicates the waveband by the first digit in the subscript and the number of the wavelength within a particular waveband by the second digit within the subscript. Accordingly, waveband two includes wavelengths $W_{2-1}$ through $W_{2-10}$. With reference to the top input fiber 224N in FIG. 5, it will be seen that the top input fiber carries each of the first wavelengths within the 10 different wavebands. Since wavelength $W_{1-1}$ is separated in wavelength significantly from wavelength $W_{2-1}$, there is much less distortion by having such wavelengths travel on the same optical fiber than there would be if wavelengths $W_{1-1}$ and $W_{1-2}$ traveled along the same fiber. Accordingly, and as illustrated with respect to the lower most of the input optical fibers 224N, each of the 10 input optical fibers 224N includes only a single wavelength from each of the 10 wavebands. All of the first wavelengths within the wavebands travel on the top optical fiber, all of the second wavelengths within the 10 optical bands travel on the second input fiber 224N, etc. Although all of the wavelengths travel on each of the optical fibers 224F at the output of the combiner 224, the length of the optical fibers 224F is relatively short such that minimal distortion would be introduced by having immediately adjacent wavelengths traveling on the same optical fiber.

With reference momentarily back to FIG. 1, it should readily be appreciated that the technique illustrated and explained with respect to FIGS. 5 and 6 could be used anywhere in the system where a lengthy optical fiber is used. For example, instead of a single optical fiber 12U in FIG. 1, a plurality of optical fibers (not shown) could be used having wavelength distribution similar to that explained with respect to input optical fibers 224N of FIG. 5. Couplers could be used to combine the optical wavelengths or carriers at places in the system where relatively short optical fibers carrying all optical wavelengths are needed.

In the arrangement of FIG. 4, the subscriber has a set top decompression box which can select the desired subcarrier frequency so as to recover the required video channel. Other subscribers on the same node select the subcarrier channels required for the particular video channel which they want to view. Assuming the simple arrangement of having the output of adder 222 used to modulate the laser 48 as shown in FIG. 4, the node 28 or node 128 (refer to FIG. 1 or FIG. 3) may include a simple optical receiver to convert the signal back to the electrical domain. No signal processing other than amplification would be required. After the node has converted the signal to the electrical domain using a standard optical receiver, the signal is passed via an active or passive coax distribution plant to the home where the set top decompression box selects the subcarrier frequency as discussed.

FIG. 7 shows a modification of a portion of the selector 202 of FIG. 4. In particular, the modification of FIG. 7 differs from FIG. 4 in that digital decompression at the subscriber's set top would not be required if the arrangement of FIG. 7 is used. The arrangement of FIG. 7 includes a quadrature amplitude modulation demodulator 226 which would receive as its input the output of a band pass or intermediate frequency filter such as filter 214 of FIG. 4. Generally, the components of FIG. 7 would replace the components shown in FIG. 4 to the right of multiplier 210 up to the adder 222 of FIG. 4. The demodulator 226 supplies a data recovery block 228 having adder 230, clock recovery 232, frame recovery 234, and channel recovery 236 connected as shown. The details of data recovery 228 need not be discussed since such data recovery blocks are well known. The data from channel recovery 236 and strobe developed by the block 228 are supplied to a digital to analog and digital decompression system 238 which, using known techniques, provides video and audio signals corresponding to the requested channel. The video and audio for the requested channel are supplied to an amplitude modulator 240 receiving a signal from local oscillator 242. The output 240U of amplitude modulator 240 would be supplied to an adder (not shown) like the adder 222 of FIG. 4. In similar fashion, outputs from various other selectors constructed in the manner illustrated for FIG. 7 could be provided to the same adder.

The details of the digital decompression system 238 need not be discussed since such decompression systems are well known. What is important about the arrangement of FIG. 7 is that the digital decompression chip may be shared by a large number of subscribers. In other words, only one of the digital decompression chips or systems 238 is required for each of the selectors 202. Assuming that 64 selectors 202 (refer back momentarily to FIG. 4) are used, only 64 digital decompression chips (system 238 is usually a chip) would be required for all of the subscribers at a particular node. Therefore, decompression of the digital data is much cheaper (a shared resource among numerous customers) than it would otherwise be.

As a further alternative to FIG. 4, a modification of FIG. 7 could be used for the selectors if digitally compressed video signals are sent via base band digital. The advantage is that base band digital transmission would provide a more robust transmission format. The disadvantage is that base band digital transmission requires more bandwidth than QAM. The alternative would have the components starting with data recover block 228 to output line 240U extend between amplifier 208 and adder 222 of FIG. 4.

As a further modification of the arrangement of FIG. 7, data and strobe signals from various of the data recovery blocks 228 may be fed to a time domain multiplexor 250 in FIG. 8. Thus, data 1 and strobe 1 come from one data recovery block such as 228, whereas data j and strobe j would come from a data recovery block in a different one of the selectors (refer back momentarily to selectors 202 of FIG. 4). Likewise, data and strobes from the other data recovery blocks (not illustrated) would be supplied to the multiplexor 250. The output of multiplexor 250 is supplied to a quadrature amplitude modulator 252. The output of modulator 252 is supplied to multiplier 254 which also receives a signal from local oscillator 256. The output of multiplier 254 is supplied on line 254L to an adder 258 where it is added to outputs of several such output lines 254L from several such multipliers 254 each of which would be connected to a different time domain multiplexor (not shown) by way of a corresponding quadrature amplitude modulator (not shown). The adder 258 serves the same function as adder 222 in the FIG. 4 arrangement. The output of adder 258 is used to modulate a laser 260 (which functions like laser 48 of FIG. 4). The laser 260 will provide quadrature amplitude modulation on the subcarriers.

With reference now to FIG. 9, an arrangement for realizing the tuneable optical filter 204 of FIG. 4 will be discussed. In the discussion which follows, it will also be useful to refer to FIG. 6 and assume that 100 different wavelengths, 10 wavelengths in each of 10 wavebands, are being received on optical fiber 200F. A tuneable Mach-Zehnder filter 300 provides coarse filtering. In particular, the filter 300 selects the waveband in which the desired channel is at. For example, assuming that the channel which is to be selected by selector 202 of FIG. 4 is a channel or video signal within waveband two (FIG. 6), the filter 300 is adjusted to allow passage of wavelengths $W_{2-1}$, $W_{2-2}$, up through $W_{2-10}$. Those 10 wavelengths within waveband two are supplied on output fiber 300F to an optical circulator 302. As indicated by the arrow within the circulator 302, the 10 wavelengths supplied by optical fiber 300F to a first port 302F of circulator 302 pass out of port 302S to an optical fiber 304 having a series of in-fiber Bragg grating elements 306A through 306J. The in-fiber Bragg grating elements or components 306A through 306J are of the known type developed by Meltz and Morey. Such gratings 306A through 306J can achieve optical bandwidths of four GHz or less. As known, these Bragg gratings can be tuned by varying their temperature. The temperature tuning coefficient is 11 to 13 pm/degrees centigrade. By selecting the three dB optical bandwidth of the gratings to be four Ghz and by setting the center reflection wavelength of the gratings on 0.35 nm centers (i.e., 1532 nm, 1532.35 nm, 1532.70 nm 1567 nm) at a nominal temperature of 20° C., a 45 GHz channel bandwidth established by the tuneable Mach-Zehnder filter 300 is divided into 10 channels. In particular, the temperature of the individual Bragg gratings 306A through 306J can be varied by plus or minus 16° C. Thus, 100 different wavelengths can be selected over 35 nm, which corresponds to the output bandwidth of the Erbium fiber amplifier used as an optical amplifier at various places within the system.

Each of the gratings 306A through 306J has a corresponding resistive heating element 308A through 308J. As with the gratings, only some of the resistive heating elements 308A through 308J are illustrated. Each of the resistive heating elements is connected to a control interface circuit 310 which simply converts a control signal on line 310N (which signal would be supplied by video selection computer 50 of FIG. 1). The control interface circuit 310 simply controls the resistive heating elements 308A through 308J corresponding to the optical wavelength which is desired. Assume that it is desired to select wavelength $W_{2-2}$, the filter 300 allows passage of all of the wavelengths within waveband two which proceed along optical fiber 304. The first grating 306A within optical 304 would have been used to select wavelengths within waveband one. Since the desired wavelength is not in waveband one (refer back to FIG. 6) and since the signals within waveband one have been filtered out by filter 300, grating 306A need not be tuned for selecting wavelength $W_{2-2}$. Alternately, control interface circuit 310 might control resistive heating element 308A such that grating 306A, which corresponds to waveband one, is tuned to a wavelength such as $W_{1-1}$ which will minimize any reflection from grating 306A for the small amount of energy in waveband one which passes through filter 300. In any case, grating 306B will be controlled in order to select wavelength $W_{2-2}$ from waveband two. (In similar fashion, grating 306C would correspond to the third waveband, grating 306J would correspond to the tenth waveband, with similar gratings located in between). By controlling the temperature of grating 306B through resistive heating element 308B, the grating 306B is tuned to reflect wavelength $W_{2-2}$. The grating 306B operates in known fashion to reflect the desired wavelength and allow passage of wavelengths other than the desired wavelengths. Accordingly, wavelength $W_{2-2}$ is reflected back from grating 306B toward the second port 302S of circulator 302. Circulator 302 then supplies the selected wavelength $W_{2-2}$ at third port 302T of circulator 302 for passage along optical fiber 204F where it can be processed further in the manner described with respect to FIG. 4 above. (The circulator is a directional transfer device and a directional optical coupler might be substituted for it if isolators were also used.)

Turning now to FIG. 10, an alternate arrangement for the tuneable optical filter will be discussed. In the arrangement of FIG. 10, components are numbered in the "400" series with the same last two digits as the corresponding component in the FIG. 9 embodiment. Circulator 402 operates the same as circulator 302 of FIG. 9 and in-fiber Bragg gratings 406A through 406J operate as with the gratings 306A through 306J of FIG. 9 with an important difference to be discussed below. For ease of illustration, FIG. 10 does not include the resistive heating elements and control interface circuit used to control the various gratings, but it will be readily appreciated that an arrangement like that of FIG. 9 would be used.

The arrangement of FIG. 10 avoids the need for a coarse tuneable filter such as 300 of FIG. 9. Since there is no filter similar to filter 300 of FIG. 9, the arrangement of FIG. 10 uses an alternate technique for selecting the waveband. With reference to FIG. 6, the arrangement of FIG. 10 requires that the waveband separation as shown is larger than the wavelength separation. In other words, the distance between wavelength $W_{1-10}$ and wavelength $W_{2-1}$ is significantly greater than the distance between, for example, wavelength $W_{1-1}$ and $W_{1-2}$. (For the technique of FIG. 9, the waveband separation might be equal to the wavelength separation.) For the arrangement of FIG. 10, the separation between the top wavelength in one waveband and the lowest wavelength in the next waveband provides what will be called an idler gap. The idler gap is at least as wide as the bandwidths B (only one labeled in FIG. 6) of the wavelengths summed with twice the wavelength separation. The manner in which the idler gap technique works is best illustrated by an example. Assume that wavelength $W_{2-2}$ is the wavelength which is to be selected. If the grating 406A was placed anywhere within waveband one, energy corresponding to its placement would be reflected back from grating 406A and would be applied by circulator 402 to optical fiber 204F. However, by tuning the grating 406A to the center of the idler gap (using the same tuning technique discussed with respect to resistive heating element 308A of FIG. 9), all of the energy in waveband one will pass through grating 406A. Since there is no energy or signal at the wavelength corresponding to the idler gap, grating 406A will not reflect any wavelengths which are present. Grating 406B would be tuned to select the wavelength $W_{2-2}$ and would reflect that wavelength in the same fashion as discussed above. By providing an idler gap in between each pair of adjacent wavebands, the various gratings 406A through 406J can provide all of the optical tuning without requiring a filter such as filter 300 of FIG. 9. If one was selecting an optical wavelength within the third waveband (not shown in FIG. 6), each of gratings 406A and 406B would be tuned to their idler gaps such that they would reflect no wavelengths. In similar fashion if a wavelength within the tenth waveband corresponding to grating 406J was to be selected, each of the nine proceeding gratings would be tuned to an idler gap. Since each of the gratings must be able to tune to the idler gap, this may slightly reduce the number of wavelengths which can be used. For example, it might be that each of the wavebands would only accommodate nine wavelengths and the idler gap would effectively correspond to the tenth wavelength which had been dropped from the waveband. Since the present system provides such a high channel capacity, the slight reduction in channel capacity may be worthwhile to avoid the need for a filter like filter 300 of FIG. 9.

Figures 11, 12:
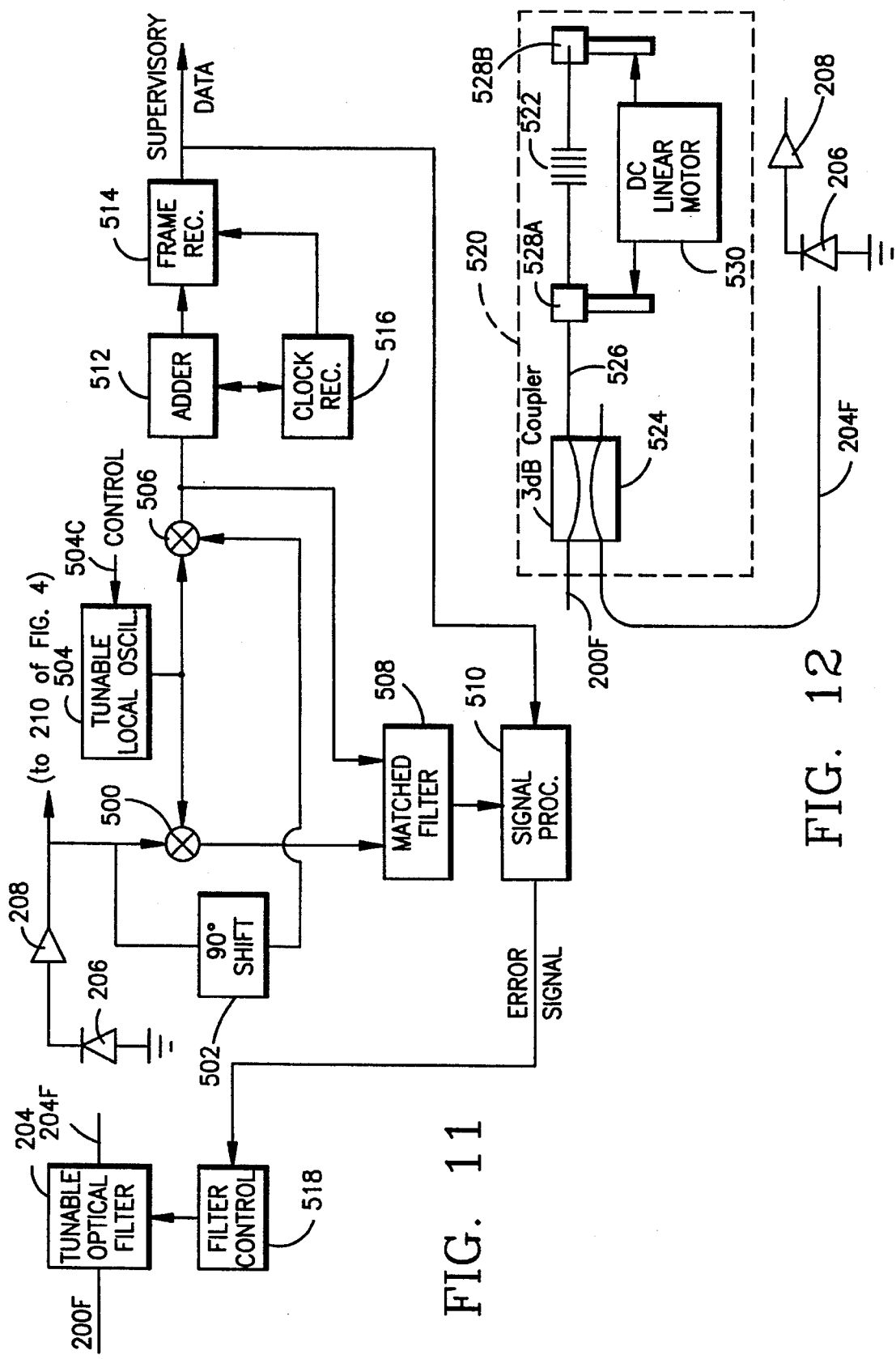
FIG. 11 shows a feedback control arrangement which may be used with the tuneable optical filters of the present invention.
FIG. 12 shows a third embodiment tuneable optical filter according to the present invention.

Turning now to FIG. 11, a feedback control circuit which may be used with the tuneable optical filter 204 of the present invention will be discussed. FIG. 11 shows optical filter 204, photodiode 206, and amplifier 208 from FIG. 4. Additionally, it shows how the output of amplifier 208 may be used as part of a feedback control loop in order to insure proper operation of the optical filter 204. The output of amplifier 208 is supplied to a multiplier 500 and a 90° phase shift 502. For the feedback control arrangement of FIG. 11, each of the 100 or so optical wavelengths (refer back momentarily to FIG. 6) may have one subcarrier which can serve two functions, identification of the optical carrier and carrying of supervisory data for the optical carrier or wavelength. If desired, the subcarrier tone in either an analog or digital signal processing scheme may be directly used to generate an error signal for locking the tuneable optical filter 204 to the required optical carrier. It is desirable that adjacent optical carriers or wavelengths have different radio frequency subcarrier frequencies so that the feedback loop will not lock to the wrong optical carrier or wavelength. However, instead of having 100 different RF subcarriers used for the approximately 100 different optical carriers or wavelengths, 10 different RF subcarriers might be utilized. In addition, each RF subcarrier would be modulated by a scheme such as FSK, ASK, QPSK, or QAM. This low data rate channel would carry unambiguous channel identification as well as additional housekeeping and supervisory data. Once the analog feedback loop has locked to the desired subcarrier frequency, the digital channel identification is checked. If the correct channel has been locked to, the search is over. If an incorrect channel has been found, a signal processing circuit will search another group. Assuming use of 10 different RF subcarriers, each of the 10 could be used for a corresponding one of the 10 wavelengths within a particular waveband (refer back momentarily to FIG. 6).

The output of amplifier 208 is supplied to the multiplier 500 and the 90° phase shift 502. A tuneable local oscillator 504 is set by control 504C (from video selection computer 50 in FIG. 1) to the frequency corresponding to the RF subcarrier of the desired optical carrier or wavelength. The output of oscillator 504 is supplied to the multiplier 500 and to multiplier 506 (which also receives the output from the phase shift 502). The outputs of the multipliers 500 and 502 are supplied to matched filter 508. The output of the matched filter 508 is supplied to the signal processing circuit 510, which also receives supervisory data supplied from adder 512, frame recovery 514, and clock recovery 516 arranged as shown. The signal processing circuit or processor 510 generates an error signal supplied to filter control 518 if the optical filter 204 is deviating from the desired optical carrier or wavelength. Additionally, the signal processing circuit 510 would indicate from the supervisory data if the feedback loop had somehow locked onto the wrong optical carrier.

With reference to FIG. 12, an alternate tuneable optical filter will be discussed. An in-filter Bragg reflective grating is used as part of the alternate tuneable optical filter 520. In particular, the grating 522 is selected with a value for R of 0.70 and an optical bandwidth of 50 pm at a wavelength of 1550 nm. By stretching this grating 1%, the wavelength can be changed to 1558 nm. Thus, the grating 522 can yield 80 optical channels or wavelengths if the channel spacing is set at 100 pm. For the total filter tuning of eight nm corresponding to 8,000 pm, 80 channels of 100 pm are provided. This will provide an information bandwidth for each optical carrier of about 2 to 3 GHz. If more information bandwidth is required, a slightly wider optical bandwidth could be used and the total number of channels could be reduced.

The optical wavelengths or carriers are provided on optical fiber 200F to a directional coupler 524. The optical wavelengths on optical fiber 200F pass through coupler 524 and on to optical fiber 526 to grating 522. As shown, clamps 528A and 528B are disposed on the optical fiber just outside of grating 522. The clamps 528A and 528B are used to stretch grating 522 by a DC linear motor 530 so as to change the length and, therefore, the wavelength at which grating 522 reflects energy. The grating 522 would typically be about 10 to 13 millimeters in length. In order to stretch the grating 522 the required 1%, the arrangement would need to stretch grating 522 in length 130 micrometers. For the necessary optical frequency resolution of one part in 400, the arrangement must be able to control the 130 micrometers to an accuracy of 325 nanometers. This precision is easily within the range of relatively inexpensive DC linear motors. For example, consumer plotters for personal computer applications have a resolution of 1,000 parts per inch which is more than an order of magnitude greater resolution than required for this application. Although not shown, various relatively standard mechanical arrangements could be used for causing the motor 530 to push against clamps 528A and 528B simultaneously depending upon the setting of the motor 530. Although not shown, the motor 530 would be controlled by the video selection computer 50 (refer back momentarily to FIG. 1).

The selected wave length is reflected by grating 522 and is coupled to optical fiber 204F for converting to the electrical domain by photodiode 206 followed by amplifier 208 and the various other components shown in FIG. 4, but not illustrated in FIG. 12.

Turning now to FIG. 13, an arrangement to drop certain channels and insert other channels is disclosed. In many proposed optical cable TV systems, it is desirable to re-utilize the optical carriers to aid system switching and to add and drop information as required. A method for accomplishing this goal is described by D. A. Smith in a paper entitled "Acousto-Optic Filters" presented at LEOS on November 16–19, 1992. However, a superior technique for reuse of optical frequency carriers is shown with reference to FIG. 13.

As shown in FIG. 13, a remove/insert system 540 receives the optical carriers or wavelengths on an input optical fiber 540N from the transmission link and provides a continuation of the transmission link on output optical fiber 540U. The output fiber 540U will contain the same channels as the input fiber 540N except that, if desired, one or more of the optical carriers may be removed by system 540 and reinserted carrying different signals thereon. The signals which are added may be carried by the same optical frequency which is dropped and would be provided from an add channel optical fiber 540A.

The optical carriers on input optical fiber 540N pass through isolator 542 and into directional coupler 544. Those signals continue on optical fiber 546 having a series of in-fiber Bragg reflective gratings 548A, 548B, through 548J. For ease of discussion, it will be assumed that 10 optical carriers or wavelengths are provided and a corresponding 10 reflective gratings 548A through 548J would be used. The number of optical carriers and corresponding number of reflective gratings could be higher or lower. With reference to FIG. 14, the wavelengths $W_A$, $W_B$, through $W_J$ correspond respectively to wavelengths of the optical carriers coming in on input fiber 540N. Each of the gratings has an associated resistive heating element controlling or tuning its frequency in the same fashion as described in more detail above with respect to FIG. 9. For ease of illustration, only one of the resistive heating elements 550A is shown, but numerous such elements would be connected to a control 552 which would cause the reflectors such as 548A to either be tuned to a reflection state corresponding to wavelength $W_A$ or to a pass through state where grating 548A would reflect optical energy only at the A pass through location indicated on FIG. 14. Since there is no optical energy at the wavelength corresponding to the A pass through, all optical energy on optical fiber 546 would pass through grating 548A when the grating is in its pass through state. It will be appreciated that the pass through state is somewhat similar to placing the gratings in the idler gap state discussed above with respect to FIG. 10. At any rate, each of the gratings is set to either reflect a corresponding wavelength or allow passage of the corresponding wavelength. Assume, for example, that the wavelength $W_B$ corresponding to grating 548B is to be dropped from the transmission link, all of the gratings except 548B will be set or tuned to reflect their corresponding wavelengths. Grating 548B will be set to a pass through position such that the optical carrier at wavelength $W_B$ will appear on the drop channel end 554. All of the other optical wavelengths will be reflected back by the corresponding gratings and upon passage through the directional coupler 544, will be supplied on output optical fiber 540U. Thus, the optical carrier $W_B$ has been dropped.

In addition to dropping the optical carrier, FIG. 13 allows one to reinsert the same optical carrier with different video or data signals imposed thereon. In particular, carriers containing information which is to be reinserted are applied to add channel optical fiber 540A and pass through directional coupler 556 on to in-fiber Bragg gratings 558A through 558J corresponding respectively to the wavelengths $W_A$ through $W_J$ of FIG. 14 and identical in construction with corresponding respective gratings 548A through 548J. Taking again the example where wavelength We has been removed and the same optical wavelength is to be reinserted carrying different video signals or other information, the control 552 would control the gratings 558A through 558J through various resistive heating elements (not shown, but same in operation as described in FIG. 9) such that all of the gratings 558A through 558J are in their pass through states except that 558B is tuned to wavelength $W_B$. Therefore, the optical carrier $W_B$ received on the add channel optical fiber 540A is reflected back through directional coupler 556 and passes through to optical fiber 560 and goes on to output optical fiber 540U by way of isolator 562 and coupler 544. (The isolator 562 simply prevents signals from going from coupler 544 to coupler 556.) Accordingly, the output optical fiber 540U will contain all of the optical carriers which were allowed to pass through together with an optical carrier which was dropped and then reinserted with alternate data, video signals, or other signals imposed thereon.

Although the discussion with respect to FIG. 13 illustrates temperature tuning of the in-fiber gratings, one could alternately tune those gratings by mechanical stretching as illustrated and explained with respect to FIG. 12. Further, it should be noted that the arrangements of FIGS. 9 and 10 could be modified by tuning the gratings therein by mechanical stretching in similar fashion to FIG. 12. In all cases, the in-fiber gratings may be constructed in known fashion. Such gratings may be commercially available types produced by United Technologies or the more recently available ATT phase plates.

With reference now to FIG. 15, a technique for local insertion will be described. Distribution of video programs via regional or metropolitan fiber networks makes it increasingly desirable to insert local programming or advertising. One method is to electrically take apart the transmission signal, then reconstruct the signal as is currently accomplished for satellite distribution of video program. The reconstruction must be done on every channel that requires local insertions. Channels that do not require local insertions may be passed through. The concept of the video switch discussed above primarily with respect to FIG. 4 together with the other concepts explained previously, show that the present system provides a cable TV system having such a large number of channels that each channel is a relatively inexpensive commodity. An advantageous manner of using the video switch network discussed above for insertion will be explained.

Before explaining the specific manner in which the video switch network of the present invention may be used for advantageous insertion of local programming, reference is made to FIG. 15 showing amplifiers 18 of FIG. 1, together with more details of the distribution chain. In particular, a Washington, D.C. hub 570 may have metropolitan programming inserted as indicated at 570P. Underneath the hub 570 would be a series of metro cells 572, only two of which are illustrated for simplicity. Under the metro cells 572 are a series of head ends 574. For ease of illustration, only three of the head ends are shown under one of the metro cells 572. As illustrated by 572P, local programming may be inserted into the metro cell. For example, if metro cell 572 corresponded to an area of northern Virginia, local programming might be inserted as indicated at 572P which would be of possible interest to residents in the northern Virginia area. If the left-most head end 574 of FIG. 15 corresponded to a particular city in northern Virginia, local programming 574P could be inserted at the head end if the local programming 574P was likely to be of interest only for residents of that particular city.

Turning now to FIG. 16, an arrangement is shown for using the video switch network of FIG. 4 in order to accomplish the insertion. The components in FIG. 16 are numbered in the "600" series with the same last two digits as the corresponding component, if any, of FIG. 4. In particular, a tuneable optical filter 604, diode 606, amplifier 608, multiplier 610 and local oscillator 612 operate as discussed above with respect to FIG. 4. What is different about FIG. 16 is that a control 630 which controls the optical filter 604 and the local oscillator 612, receives channel control data indicating that a substitution of one signal for another should occur. The optical filter 604 and/or local oscillator 612 are simply switched to an alternate optical carrier and/or radio frequency carrier to the location of the program which is to be inserted. At the time when the viewer is supposed to return to the primary video signal or channel, the control 630 simply adjusts the optical filter 604 and/or local oscillator 612 back to the appropriate settings for the primary source video signal or channel. This may be done in a manner that is transparent to the viewer. For example, each primary video channel or signal could have a low data rate control channel associated with it that would tell the video switch what channel was required for local programming, what time to switch, and how much time to allow before returning to the primary source. Alternately, the local program could signal the video switch when to return to the primary program. Local or metropolitan programming could be inserted at the logical point in the regional tree and branch network as discussed with respect to FIG. 15. However, local programming could alternately be inserted in the regional network at a higher level than required since this may be desirable for operational or logistical reasons and since so many channels are available. For example, with reference to FIG. 15, the local programs indicated at 572P and 574P could be inserted with the metro programs 570P at the metropolitan hub 570.

The arrangement of FIG. 16 provides an output from the multiplier 610 which would be processed in the same fashion as the output from multiplier 210 of FIG. 4. Note that the arrangement of FIG. 16 could be used as part of a video switch network 46 of FIG. 4 wherein the video switch network was disposed within the head end 26 (refer back momentarily to FIG. 1). Likewise, that modified video switch network could be used in the metro cell 572 of FIG. 15, the metropolitan hub 570 of FIG. 15, or more generally the metropolitan hubs 20 of FIG. 1. In that case, and with reference to FIG. 1, the regular broadcast channels could be delivered on optical fibers 26F. If a particular broadcast channel was going to have a local commercial, the control 630 of FIG. 16 would remove the primary channel or source and substitute a different channel or source having the commercial thereon.

If desired, the control 630 would not change optical filter to insert a new channel. Instead, the substitute channel would be on the same optical carrier as the primary or initial channel. A subcarrier tone which carries control information can be placed on the primary channel. This control information will indicate the correct radio frequency subcarrier channel for tuning in order to obtain the correct local programming and will indicate which digital bit stream if 64 QAM is being used. In like manner, a control tone on the local programming can tell the video switch when to switch back to the primary programming. As an alternate, the initial subcarrier control information may indicate the proper channel for local programming and a length of time. After a correct amount of time has elapsed, the signal processing unit switches back to the primary channel. The method described may be superior to a similar method discussed herein wherein different optical carriers are used to accomplish the same result. The advantage of this method is that it avoids possible delays if the optical tuner has a slow response time in tuning from one optical frequency to another.

With reference now to FIG. 17, a further arrangement is shown for insertion of local programming. This arrangement, which could, for example, be located in the metro hub 570 of FIG. 15, receives inputs from optical fiber 18F (refer also back to FIGS. 15 and FIG. 1 with respect to the location of this optical fiber). The optical fiber 18F supplies signals to a plurality of insertion networks 740, only two of which are illustrated for simplicity. Since each of the insertion networks 740 includes numerous components identical to the components of the selector 202 of FIG. 4, components in the arrangement of FIG. 17 are labeled in the "700" series with the same last two digits as the corresponding component, if any, from FIG. 4. Thus, a tuneable optical filter 704 operates in similar fashion to optical filter 204 of FIG. 4. For ease of illustration, the control for the optical filter is not illustrated, but control may be accomplished as discussed previously with respect to FIG. 4. Photodiode 706 and amplifier 708 operate in the same fashion as the corresponding components of FIG. 4. The output from amplifier 708 is supplied to a low pass filter 742 which leaves the radio frequency carriers carrying the regional signals in place. Referring momentarily to FIG. 18, the operation of filter 742 will be better understood.

In the system as discussed, subcarrier multiplexing is used in conjunction with a modulation format such as 64 QAM on six MHz channel spacing. If two GHz of radio frequency bandwidth per optical carrier is used, about three hundred of the six MHz channels are available. Assuming that 10 video channels are used for each radio frequency subcarrier, three thousand video channels can be used on a single optical carrier. With such large channel capacity, a certain number of the primary video programs which originate at the regional head end will require the insertion of local programming. In this case, space may be left in the radio frequency domain for additional channels which can be added at the metro level. As shown by the radio frequency spectrum of FIG. 18, the regional radio frequency carriers will pass through the filter 742, whereas frequencies above the regional carriers will be blocked by filter 742. The local programming may be added at those frequencies in the manner illustrated in FIG. 17.

The regional carriers passing through 742 are supplied to an adder 744 which also receives local programming on radio frequency carriers above the cutoff frequency of the filter 742. For ease of illustration, FIG. 17 does not illustrate the actual programming signals being supplied to a modulator (QAM, or other desired type), but this may be accomplished in similar fashion to that discussed with respect to FIG. 2. Although not shown, one could additionally have the local programming time division multiplexed in the fashion illustrated in FIG. 2. The adder 744 combines the regional carriers which are passing through insertion network 740 with the additional carriers having the local programming thereon and passes these signals through to a modulator 746 modulating laser energy from laser 748. The output of modulator 746 is therefore an optical carrier having the radio frequency subcarriers corresponding to both the regional radio frequency carriers and the local programming carriers of FIG. 18. The output of modulator 746 is supplied by optical fiber to coupler 750, which is an optical signal combiner combining the various optical carriers from the different insertion networks 740 and supplying them on an output optical fiber 750F which may be used to distribute programming from the regional head end. It should be appreciated that the arrangement of FIG. 17 avoids the need for totally disassembling the numerous channels. Although the channels are converted from the optical domain to the electrical domain, the regional radio frequency carriers are allowed to pass through without requiring further disassembly.

With reference now to FIG. 19, a further possible modification of the video switch network of FIG. 4 is illustrated. The arrangement of FIG. 19 has numbers in the "800" series with the same last two digits as the corresponding component, if any, from the arrangement of FIG. 4. The arrangement of FIG. 19 continues the strategy of the present system of providing resource sharing such that the more expensive hardware which would be used only a fraction of the time by any one subscriber can be located at the video switch network. In FIG. 19, tuneable filter 804, photodiode 806, multiplier 810, and local oscillator 812 operate as before. A demodulator 840 demodulates the output of multiplier 810 and, in turn, supplies its output to a computer 842 connected by a bus 844 to RAM 846, disc drive 848, computer 850 receiving control information from a subscriber, microprocessor 852, and computer 854. The computer 854 also provides an output to a 64 QAM modulator 856 connected to multiplier 818 receiving an input from local oscillator 820. The multiplier 818 supplies its output to an adder 822 which receives signals from other such multipliers 818, only one other one being shown for ease of illustration. The components between optical filter 804 and multiplier 818 including local oscillator 820 may be substituted for each of the selector blocks 202 in the arrangement of FIG. 4.

The arrangement of FIG. 19 allows the subscriber to access a computerized arrangement to improve the functions of the video switch network. For example, if the subscriber is watching a movie, the computer arrangement can provide a forward, reverse, and freeze frame capability as with a video cassette recorder. By having sufficient memory within the video switch, the subscriber can obtain those features. Further, the computerized video switch network of FIG. 19 will facilitate multi-media games or other required computer functions.

Figures 20, 21, 22:
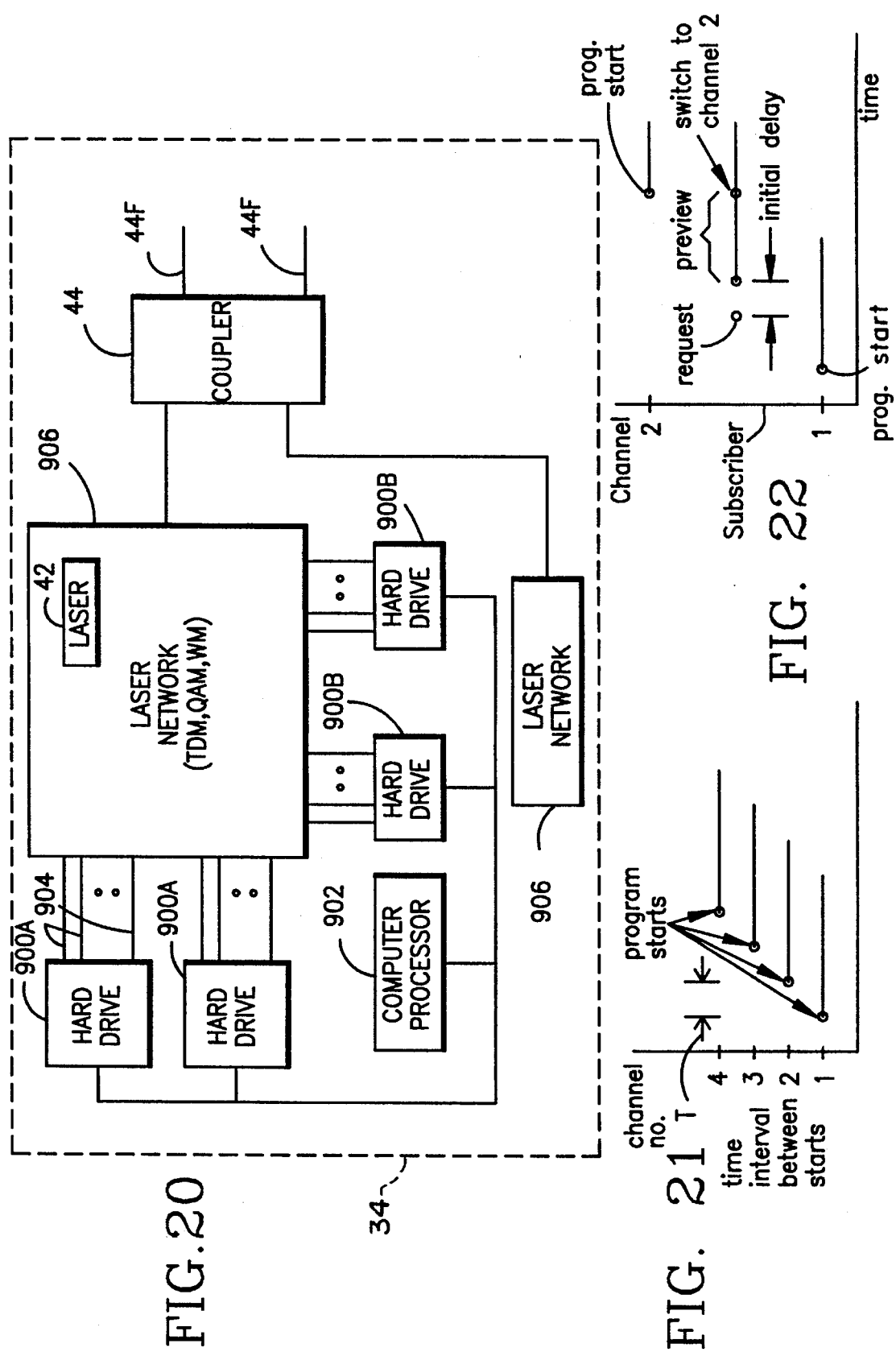
FIG. 20 shows details of an on demand program center according to the present invention.
FIG. 21 is a time chart illustrating certain principles of operation of FIG. 20.
FIG. 22 is a more detailed time chart indicating a particular aspect of operation of the arrangement of FIG. 20.

Turning now to FIG. 20, more details of the on demand program center 34 of FIG. 1 will be discussed. Initially, it should be emphasized that the on demand program center 34 may be located at the same location as the regional transmitter 12. Therefore, a single such program center 34 may be used for all of the metropolitan areas within a particular regional zone. This furthers the present system's use of shared resources whereby the most expensive resources are shared over the widest possible area. It will also be appreciated that the tremendous channel capacity of the present system such that each channel is relatively inexpensive, allows one to set up the program center 34 according to the present invention.

The program center 34 will provide movies or other pay per view or video on demand programs. In the discussion which follows, the emphasis will be on movies, but other programs could of course use the concepts which will be discussed. A series of hard drives 900A and 900B are controlled by a computer processor 902. Each of the hard drives 900A has stored thereon a complete copy of a 100 minute movie. In similar fashion, each of the hard drives 900B have digital versions of a movie, different from the movies stored on hard drives 900A. With reference to the top hard drive 900A, 10 outputs 904 symbolically indicate that the hard drive 900A is being accessed sufficiently fast to provide time-offset versions of the same movie corresponding to 10 different times. In other words, accessing the hard drive sufficiently fast may provide 10 signals corresponding to time-shifted versions of the movie stored on hard drive 900A. If desired, the 10 outputs 904, only three of which are illustrated, may be obtained by supplying the actual output of the hard drive to a time division demultiplexor which switches the actual output of the hard drive onto 10 different sample and hold circuits whose outputs are the actual lines 904. However, various known techniques can alternately be used for simply supplying the 10 different time-shifted versions of the movie from hard drive 900A.

With reference now to FIG. 21, the time shifting is illustrated by assuming that each of the outputs 904 corresponds to one channel. Channel one has the movie starting at a particular point, channel two has the movie starting at a point occurring later in time than the start of channel one, and so forth. If the ten outputs from the top hard drive 900A have staggered starts every five minutes and the 10 outputs from the other hard drive 900A are staggered every five minutes starting 55 minutes after the program start of the first output 904 of top hard drive 900A, the 20 output lines from the pair of hard drives 900A provide 20 different time-shifted signals corresponding to the movie. For a 100 minute movie, 20 time-shifted signals allows the system to be starting the movie within five minutes of any subscriber's request as will be described in more detail below. As soon as the movie has been completed on a particular one of the output lines from hard drives 900A, the movie is restarted. Thus, the movie is being continuously played on the 20 output lines from the pair of hard drives 900A. In similar fashion, a different movie stored on hard drives 900B may provide time-shifted signals corresponding to that movie every five minutes.

The 20 time-shifted signals corresponding to each of the movies stored on the various hard drives (more than the two pairs illustrated) are provided to a laser network 906 of which laser 42 (refer back momentarily to FIG. 1) is a part. The laser network 906 provides time division multiplexing, quadrature amplitude modulation (or other radio frequency modulation) and optical wavelength modulation using the same technique described in detail above with respect to the first laser network 52 of FIG. 2. Considering that the technique allows a single laser to carry 3,000 different video channels or signals, a single such laser network 906 could provide 150 different 100 minute movies staggered at five minute starting times. Thus, 150 pairs of hard drives would be connected to the laser network 906. Considering FIG. 20 in conjunction with FIG. 2, it may be noted that the 10 different output lines symbolically illustrated from hard drive 900A might be dispensed with and the single output line from such a hard drive could be supplied directly into the quadrature amplitude modulator such as 56 of FIG. 2. In other words, the hard drive 900A would be inherently performing the time division multiplexing and would not require a multiplexor such as 54 of FIG. 2.

A second laser network 906 is shown below the top laser network 906. For ease of illustration, the various hard drives and computer processor associated with that laser network are not shown, but it will be understood that this second laser network 906 would operate in the same fashion as discussed. Further, numerous additional laser networks could be used. If 100 such laser networks were used, the program center 34 could provide continuous versions of 15,000 movies, any particular movie starting no more than five minutes away from a particular time. The movies would be supplied by optical fibers 44F to the video switch networks 46 shown in FIG. 1 and discussed in more detail above.

An important feature of the present system is that the hard drives, for example, 30,000 corresponding to 15,000 pairs for 15,000 movies, can be located at the regional hub. Therefore, the relatively large expense of providing the massive storage corresponding to all of these movies may be spread over the numerous subscribers on the various metropolitan hubs 20 (refer back to FIG. 1). It should further be appreciated that FIG. 20 does show the use of hard drives, but other storage devices might be used to implement the concept of the present invention whereby movies are run continuously and the video switch network 46 of FIG. 1 is used to switch the movies to a particular node upon request by a subscriber.

Turning now to FIG. 22, a method will be described to minimize dead air time after a subscriber has requested one of the pay per view or on demand movies stored with the program center 34. FIG. 22 shows a time line illustrating channels one and two and having a subscriber line indicating that the subscriber requests a particular movie after the program has started on channel one and before the start of the program on channel two. After an initial delay, a preview may be supplied to the subscriber. The preview would be delivered by control of the video switch network 46 discussed above with respect to FIG. 1. The preview may be one of a large series of previews stored upon hard drives such as those discussed with respect to FIG. 20. The previews may be various 30 second or one minute long previews stored upon hard drives and delivered by the same arrangement discussed with respect to FIG. 20. Since the previews are supplied in time-shifted or staggered versions in the same fashion as the movies or other programs which are requested, the initial delay before the preview starts may be very slight. As indicated on the subscriber line of FIG. 22, the video switch network 46 of FIG. 1 will switch to channel two upon completion of the preview time and when the program start on channel two actually occurs.

With reference now to FIG. 23, a slight modification of the arrangement of FIG. 20 is illustrated in order to hold down the cost of the hard drives. Since the hard drives used in FIG. 20 have a cost which is dependent upon the storage capacity, the arrangement of FIG. 23 may provide the same five minute staggered starts discussed with respect to FIG. 20, while reducing the storage capacity and, thus, the cost. The hard drive 910 stores a complete version of the movie in question and has 10 outputs 912 on which the 10 time-staggered versions are provided. However, the hard drive 914 has only half the storage capacity of hard drive 910. Basically, the hard drive 914, which can only hold one half of the movie, is used as a delay line. Hard drive 914 receives an input on line 916 which comes from the last-to-start output line 912 of hard drive 910. Accordingly, when the 10 time-staggered output lines 918 of hard drive 914 are in the first half of the movie, the output lines 912 of hard drive 910 will be in the second half of the movie. At any given time, different portions of the movie will be provided by the different hard drives 910 and 914. Since hard drive 914 has only half the storage capacity of hard drive 910, it may be significantly less expensive than hard drive 910.

It should be appreciated that the arrangement of FIG. 23 could be repeated for more than two hard drives. Although not shown, an output from hard drive 914 could be fed as an input to a third hard drive having one half the capacity of hard drive 914. This will allow a larger number of time-staggered versions of a particular program, such as a very popular movie, to be provided. It will of course be readily appreciated that the five minute time for staggering the starts could be more or less depending upon various factors.

Figure 24:
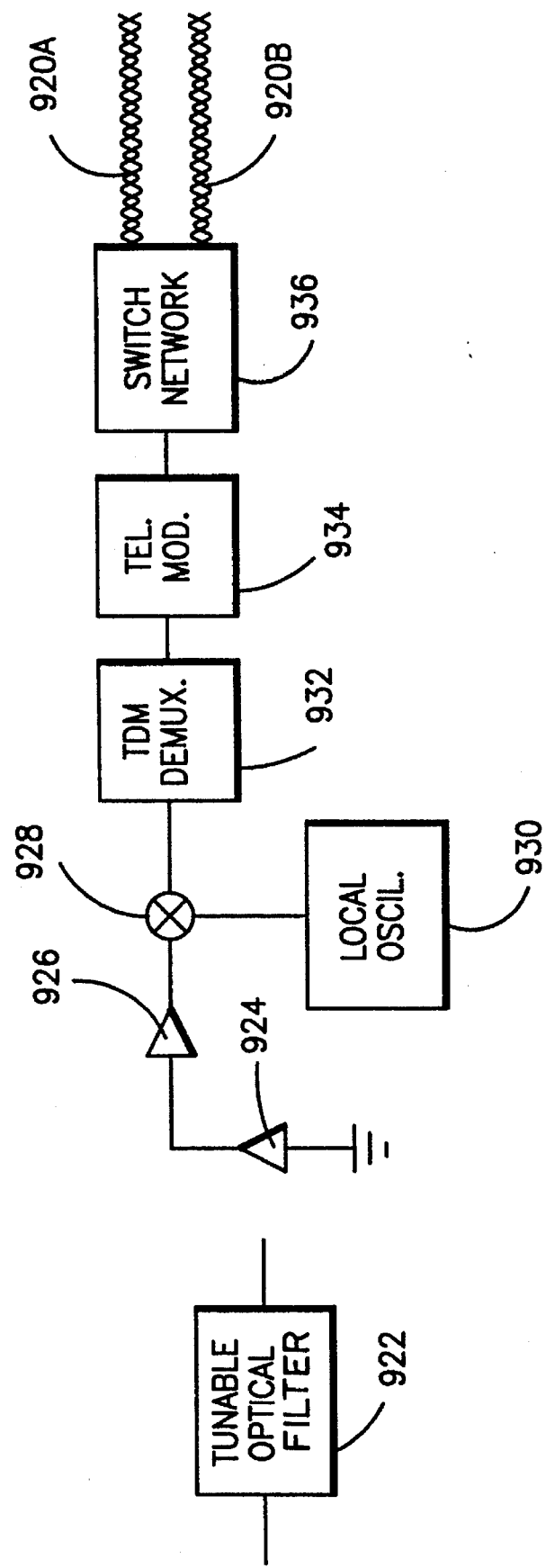
FIG. 24 is a video selection arrangement for use in providing on demand video signals by way of telephone company twisted pairs of wires.

Turning now to FIG. 24, a modification of the video switch network 936 of FIG. 4 is illustrated for providing video by way of twisted pair telephone wires 920A and 920B. A tuneable optical filter 922, photodiode 924, amplifier 926, multiplier 928, and local oscillator 930 may operate in the same fashion as described with respect to FIG. 4. The output from multiplier 928 is supplied to a time division demultiplexor 932 which selects one video signal for application to a telephone-compatible modulator 934. The modulator 934 uses a carrierless type of modulation as developed by one or more telephone companies in order to provide a video channel upon twisted pair wires such as 920A and 920B. In particular, the telephone system includes an extra twisted pair and the telephone modulator 934 is a previously developed device to deliver a video signal over that twisted pair. The output of modulator 934 is switched by switch network 936 to one or more of the twisted pairs 920A, 920B, or any of numerous additional twisted pairs, not illustrated. Although not illustrated, the components between filter 922 and telephone modulator 934 could be duplicated with, for example, 10 such networks arranged to provide 10 telephone-format modulated signals at 10 different inputs to the switch network 936. The switch network 936 would then simply be set up to supply any of, for example, 100 twisted pairs connected to outputs of the switch network with any of 10 different inputs supplied to the switch network 936.

Figure 25:
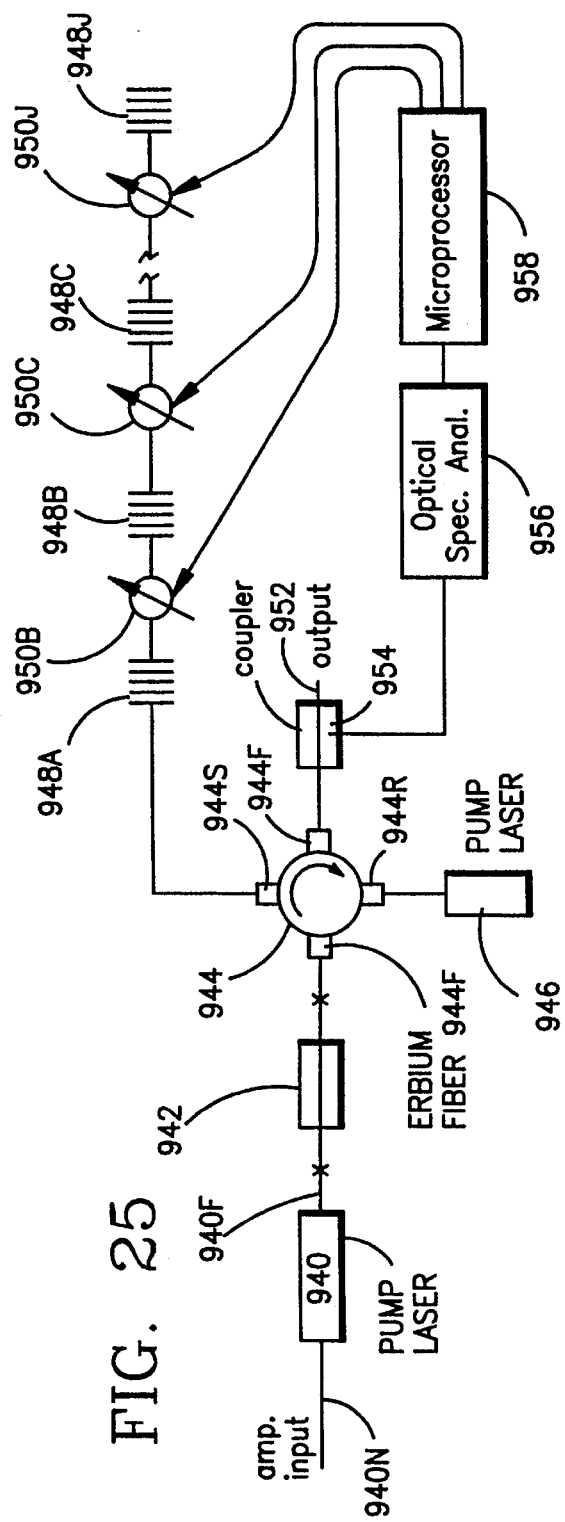
FIG. 25 shows an optical amplifier arrangement.
Figure 26:
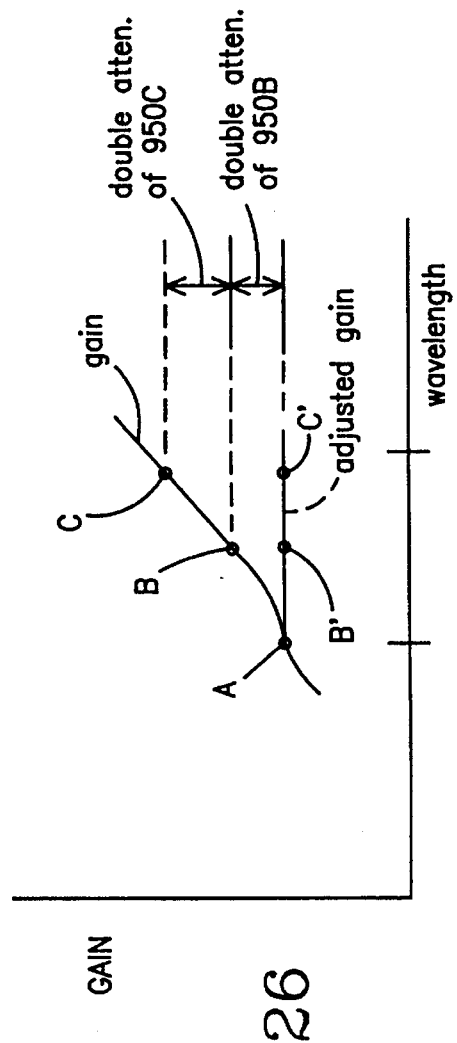
FIG. 26 shows a gain curve to illustrate operation of the FIG. 25 amplifier.

Turning now to FIG. 25, an optical amplifier arrangement is shown. A pump laser 940 receives input from optical fiber 940N. The output optical fiber 940F, including the laser energy from the pump laser and the optical signals received at the amplifier input 940N are supplied to an Erbium fiber 942 connected to a first port 944F of a circulator 944. The port 944F also supplies laser energy from pump laser 946 by way of a port 944R of circulator 944. The laser energy supplied by the pump lasers 940 and 946 excite the Erbium ions such that the optical signals received on input fiber 940N will be provided in amplified form out of port 944S of circulator 944. However, the gain of this optical amplifier may be nonuniform over wavelength as indicated by the gain curve of FIG. 26. In-fiber Bragg gratings 948, 948A, and optical attenuators 950B through 950J are used to filter out the laser energy inserted by the pump lasers 940 and 946 and are used to provide a relatively flat adjusted gain curve as shown in FIG. 26. In particular, the signals coming in on amplifier input 940N include ten different optical wavelengths as previously discussed. Therefore, 10 of the gratings 948A through 948J would be included, one for each of the wavelengths. The gratings would be used to reflect the optical energy at the corresponding wavelength. The gratings 948A through 948J could be tuneable in the same fashion as the gratings discussed above, although the gratings would preferably simply be maintained at a sufficiently stable temperature that they would maintain their reflective characteristics for the corresponding wavelength.

As shown on the small portion of the gain curve illustrated in FIG. 26, the wavelength corresponding to point A has the lowest gain from the optical amplifier. Therefore, optical energy at that wavelength is reflected back to port 944S of circulator 944 without any attenuation. Since the wavelength corresponding to point B of FIG. 26, which also corresponds to grating 948B, has a higher gain than the wavelength corresponding to point A, an adjustable attenuator 950B attentuates the optical energy at the wavelength corresponding to point B. Considering that optical energy passes through attenuator 950B twice, bringing the gain down from point B to point B' in FIG. 26 requires that attenuator 950B provide one half of the attenuation required to move from point B to point B' in FIG. 26.

Optical energy at the wavelength corresponding to point C of FIG. 26 may be adjusted down to the flat response curve or adjusted gain of FIG. 26 at point C' by having attenuator 950C provide an attenuation equal to one half of the difference in gain between point B and point C. By using the same technique at the different wavelengths, one can provide an adjusted gain curve which is relatively flat. The various reflected optical wavelengths or carriers enter the circulator at 944, whereas the laser energy from pump lasers 940 and 946 would be at different wavelengths and not reflected back to that port. The optical energy entering at 944S is supplied by circulator 944 to a port 944T and provides the output at optical fiber 952. Optionally, a coupler 954 supplies the output to an optical spectrum analyzer 956 which is connected to a microprocessor 958. The microprocessor in turn controls the adjustable optical attenuators 950B through 950J so as to provide a flat response curve corresponding to the adjusted gain illustrated in FIG. 26.

For the above arrangement, it is assumed that all of the gratings have the same reflectivity. The control of the optical attenuators can be accomplished using known techniques. In the specific aspect of the present invention, the optical attenuator 950B would first be adjusted until the gain at point B was the same as the gain at point A. This is done by making the attenuator 950B correspond to one half of the difference in gain between points A and B. The attenuator 950C is then adjusted until the gain at that wavelength corresponds to the gain at point A. This process may be repeated for all 10 (or some other number) of the optical carriers in such a wave division multiplexed optical system.

By providing the spectrum analyzer 956 and microprocessor 958, the gain of the amplifier (all those components numbered between 940N and 954 can be maintained to provide a flat response curve.

The amplifier of FIG. 25 is an improvement of one disclosed and claimed in the present inventor's prior application U.S. Ser. No. 07/919,823 filed Jul. 27, 1992, entitled "Optical System With Grating Reflector" and hereby incorporated by reference. The amplifier of FIG. 25 may be used as optical amplifiers 18 and 62 of FIG. 2 and at other places in the system.

Figure 27:
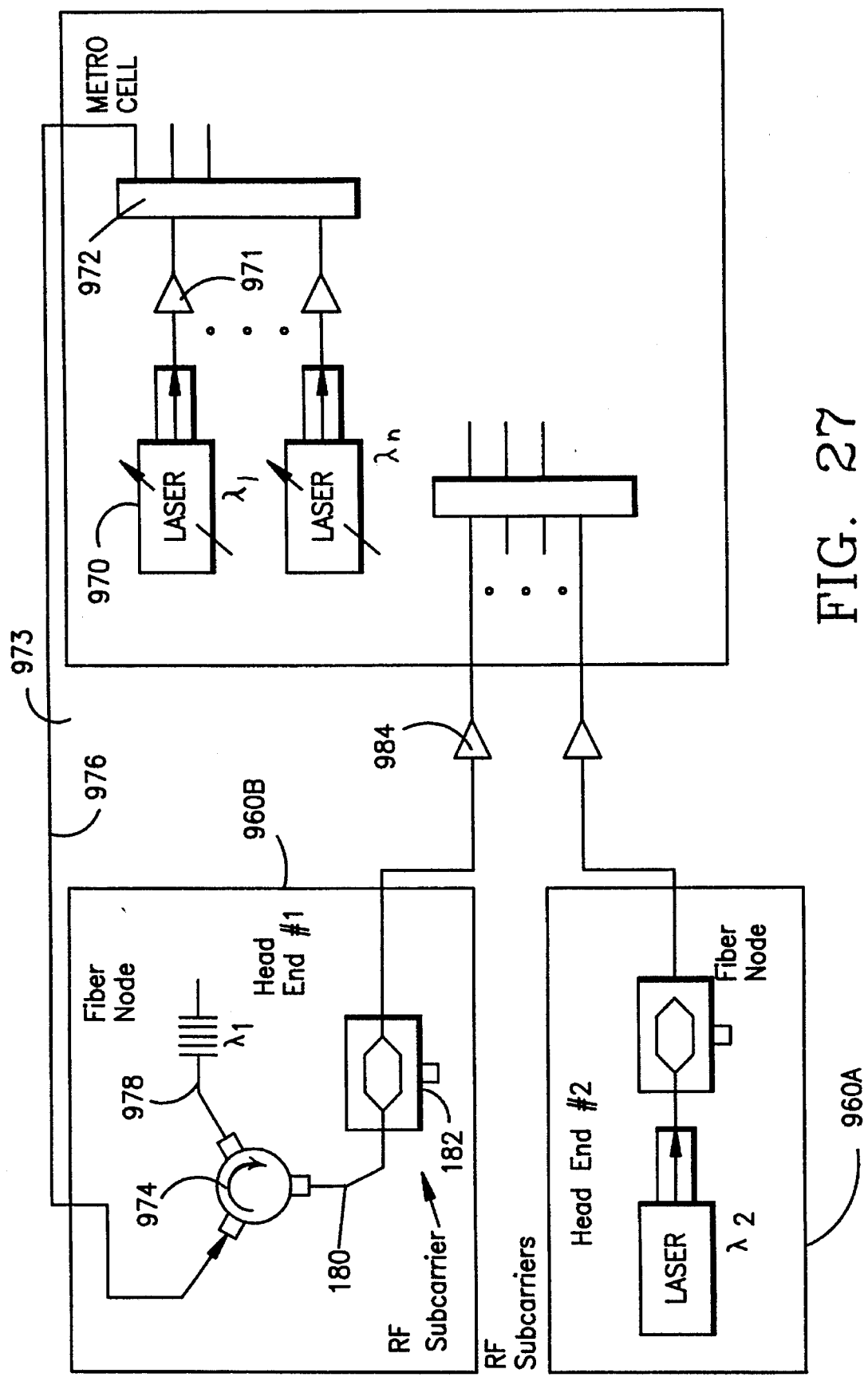
FIG. 27 shows an optical source head end configuration.

The optical source at the head end of the system can be configured using either of the two techniques shown in FIG. 27. The technique corresponding to 960A is use of a laser at the head end as also previously shown and discussed herein. However, one could alternately use a tuneable laser diode residing at the metrocell as shown for 960B. The advantage of using a tuneable laser diode is that the tuner is a shared resource. In initial deployment, not all of the nodes will require simultaneous operation (because of lack of traffic). Therefore, a tuneable laser can address the grating at the head end which is requesting data or video transmission. As service demand grows, additional tuneable lasers can be added or a dedicated laser can be added at the head end. In order to efficiently multiplex or switch the required information, it is desirable to carry as many radio frequency frequency domain multiplexed subcarrier channels as possible on a single optical wavelength. The radio frequency modulation format could be analog FM, FSK, QPSK, or possibly QAM. In addition, the arrangement may include a mixture of subcarrier modulation formats for optimum matching of modulation format with the type of data needed to be transmitted.

Figure 28:
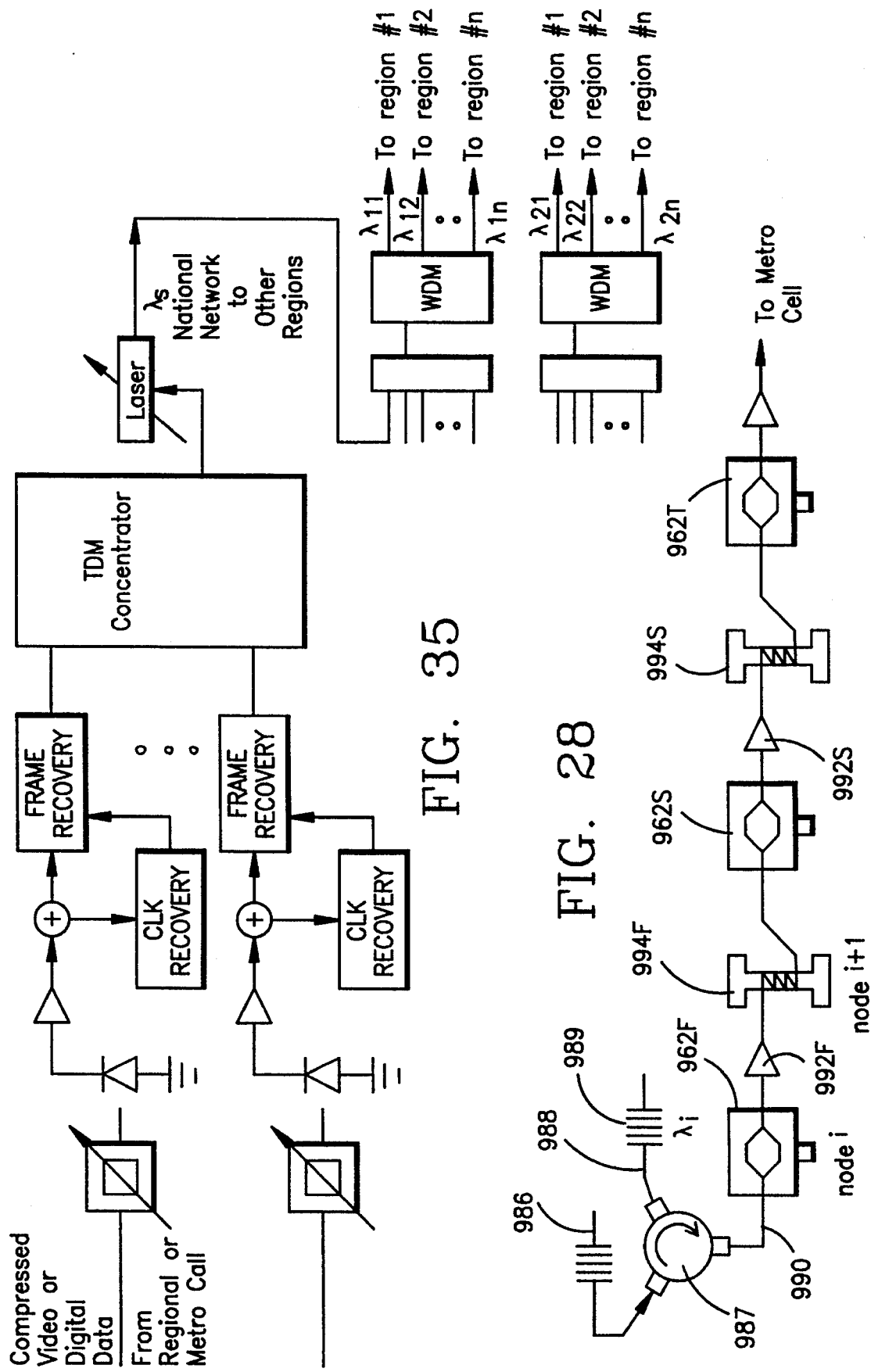
FIG. 28 shows a daisy chain modification of the FIG. 27 arrangement.

In initial deployment, each node may not be able to generate sufficient data to efficiently utilize an optical carrier. In this case, a number of nodes could be daisy chained together as shown in FIG. 28 (a variation on 960B of FIG. 27). The daisy chain arrangement has optical fibers similar to 128F of FIG. 3 linked together between modulators 962 corresponding to different ones of the nodes.

In the daisy chain case, it is required that none of the radio frequency subcarriers used at node i of FIG. 28 also be used at node i plus 1 or at node i plus 2. As data and video traffic increase, each node can be reconfigured to have a unique optical carrier. If each optical carrier supports 2 GHz of radio frequency bandwidth and analog FM placed on radio frequency subcarriers spaced 40 MHz apart, there would be 50 radio frequency subcarrier channels. If, in addition, each metro cell has 100 optical carriers, the metro cell is capable of carrying 5,000 simultaneous calls. Assuming an initial network utilization of 1%, the network is capable of serving 500,000 subscribers. If each regional cell has 100 metro cells, each region could service 50 million subscribers. Even at 10% network utilization, a regional cell could service five million subscribers. If network service demands exceed that described, the capacity can be expanded by increasing the number of optical carriers and/or utilizing space division multiplexing.

In the case of this type of video phone information that originates at the node and which is stay within its own metro cell, analog FM modulation format is sufficient. Video information going to other metro cell or out of the region can be digitally compressed and concentrated.

Figure 29:
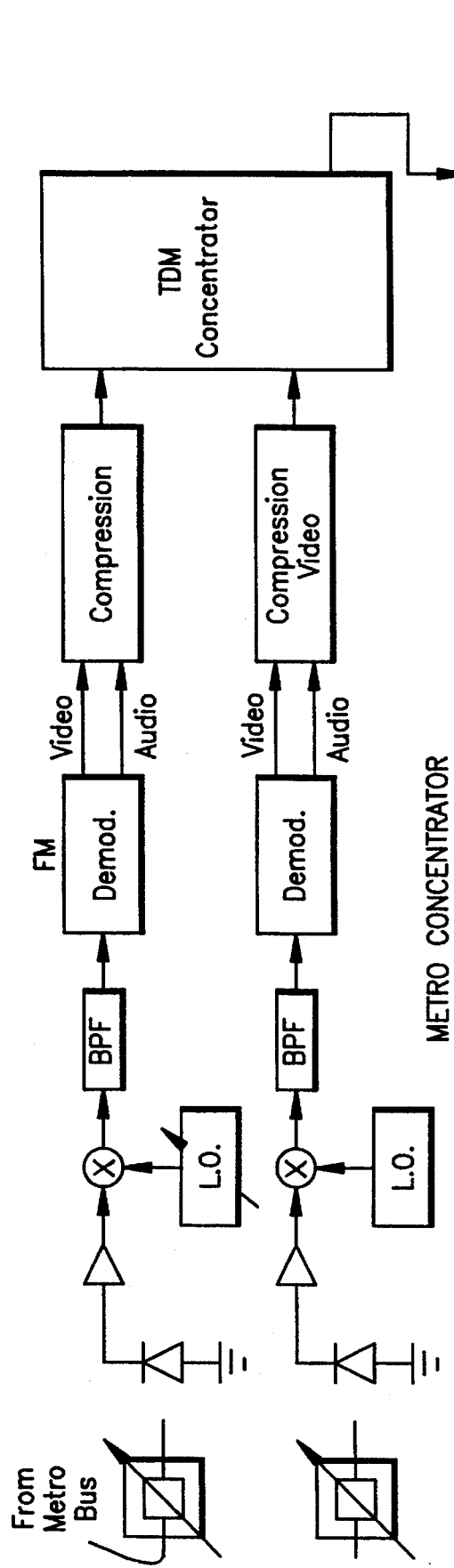
FIG. 29 shows a metro concentrator.

FIG. 29 shows a metro concentrator which may provide the concentration and compression as discussed. A regional concentrator could be made in essentially the same fashion.

Figure 30:
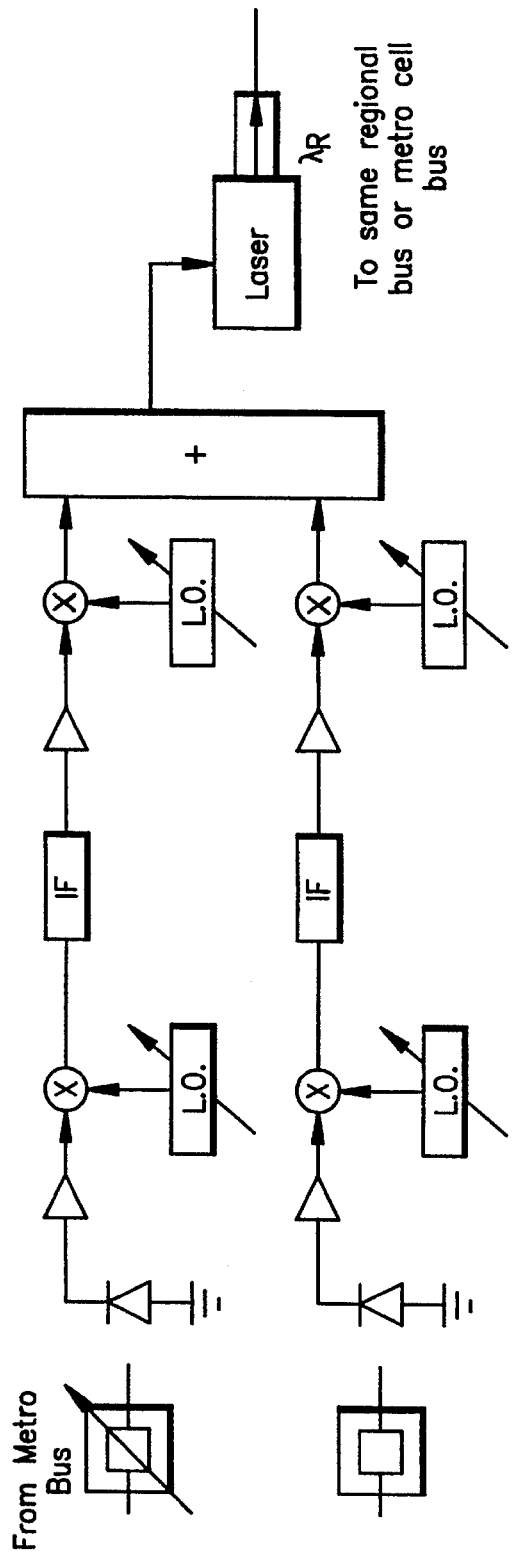
FIGS. 30 and 31 show alternate base band digital transmission techniques.
Figure 31:
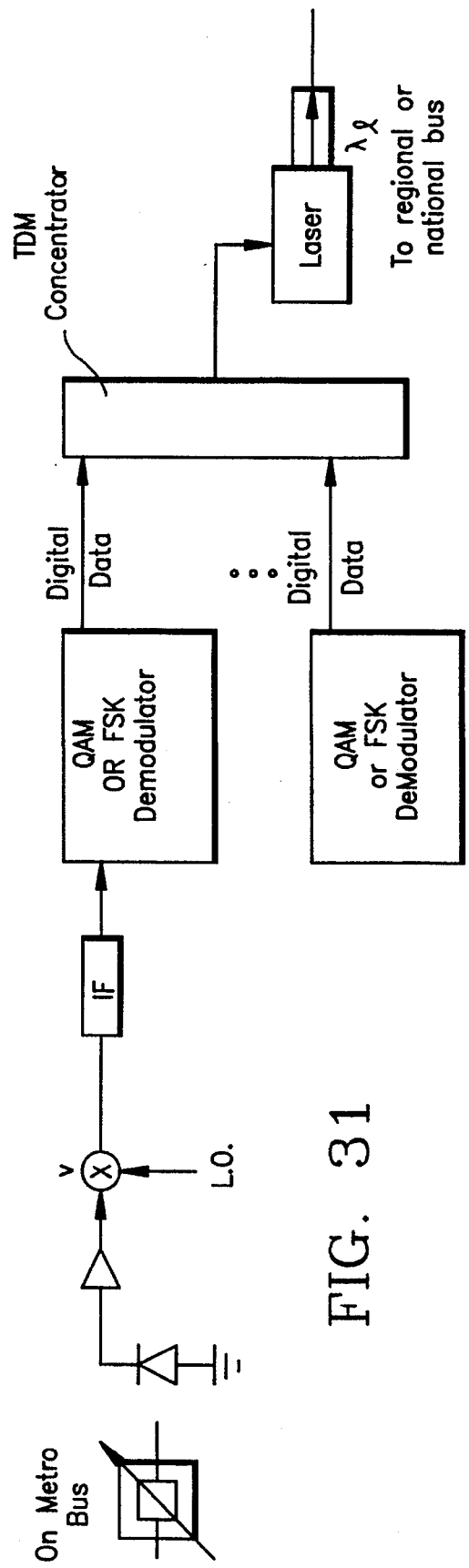

With reference to FIG. 30, if network demand is sufficient or if it is necessary to transport digital data to another region, base band digital transmission can be utilized as shown. An alternate arrangement for such transmission is shown in FIG. 31.

Figure 32:
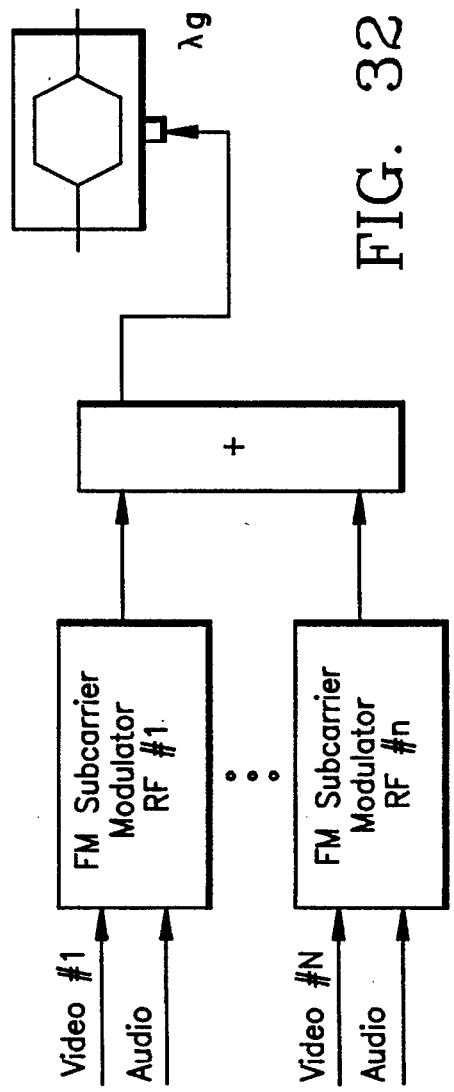
FIG. 32 shows a technique for placing information on fibers.

With reference now to FIG. 32, the information may be placed on the fibers at the node using the illustrated technique. If the information is digital data, it may be placed on the fiber node as shown in FIG. 33.

With reference to FIG. 34, video phone information and digital data originating at the home of the subscribers (upstream data) may be concentrated into base band digital data for transmission on the regional bus (if service demands are great, high composite data rate). Data sent on the national network will most likely require base band digital because of the large distances required. Once the data reaches the required region, the data can be demultiplexed into data rates which more nearly match the rates required by the subscriber.

With reference now to FIG. 35, data generated within the metro cells for transmission for the national network (possibly the regional network if demand is sufficient) may be processed as shown in FIG. 35. It should be noted that the tuneable optical filter for selection of time division multiplex data and the tuneable output frequency laser allow dynamic network allocation of resources. The output frequency of laser can select data destination as shown in the example of FIG. 35. The outputs at the regions at the far right of FIG. 35 may provide either reuse of optical carrier frequencies by space division multiplexing or more than one wavelength for transmission to each different region.

Various specific constructions and details have been given in the present specification, but it is to be understood that these are for illustrative purposes only. Various modifications and adaptations of the present invention will be apparent to those of skill in the art. Accordingly, the present invention should be determined by reference to the claims appended hereto.

What is claimed is:

1. A tuneable optical filter comprising:
    a directional optical transfer device;
    a first optical fiber for carrying a plurality of optical carriers, to said transfer device;
    a second optical fiber connected to said transfer device for receiving said plurality of optical carriers;
    a tuneable first in-fiber grating in said second optical fiber;
    a first controller for tuning said first in-fiber grating to reflect a desired optical carrier back to the transfer device; and
    a third optical fiber connected to said transfer device for receiving optical carriers reflected back to the transfer device by said first in-fiber grating.

2. The tunable optical filter of claim 1 wherein said first in-fiber grating is one of a plurality of tuneable in-fiber gratings in said second optical fiber and said first controller is one of a plurality of controllers for tuning each of said gratings.

3. The tunable optical filter of claim 2 further comprising an adjustable waveband filter connected upstream in a signal flow direction from the first optical fiber, the first optical fiber carrying only signals in a pass band to which the waveband filter is adjusted, the pass band being selected from a number of input wavebands, each input waveband having a plurality of different wavelength optical signals therein.

4. The tunable optical filter of claim 3 wherein each of said in-fiber gratings is tunable to the different wavelengths of the optical signals within a corresponding one of the input wavebands.

5. The tunable optical filter of claim 2 wherein each of the in-fiber gratings has a pass band corresponding to one of a number of input wavebands carried by the first optical fiber, each input waveband having a plurality of different wavelength optical signals therein.

6. The tunable optical filter of claim 2 wherein each in-fiber grating is tunable to an idler gap removed from any of the different wavelength optical carriers on said first optical fiber.

7. The tunable optical filter of claim 2 further comprising a feedback loop selectively controlling the controllers to lock onto a desired optical carrier having a given RF subcarrier detected by the feedback loop.

8. The tunable optical filter of claim 1 wherein said first controller is a heating element.

9. The tunable optical filter of claim 1 wherein said first in-fiber grating has a length and said first controller mechanically changes the length of said first in-fiber grating.

10. The tunable optical filter of claim 1 wherein the directional optical transfer device is an optical circulator.

11. The tunable optical filter of claim 1 wherein the directional optical transfer device is a directional coupler.

12. A remove and insert system for removing and inserting optical carriers comprising:
    a first directional optical transfer device;
    a first optical fiber for carrying a plurality of optical carriers to said first transfer device;
    a second optical fiber connected to said first transfer device for receiving said plurality of optical carriers;
    a plurality of tunable in-fiber gratings in said second optical fiber;
    controllers for tuning each of said gratings to reflect a desired optical carrier back to the first transfer device;
    a third optical fiber connected to said first transfer device for receiving optical carriers reflected back to the first transfer device by said gratings;
    a fourth optical fiber having first and second ends, the first end being connected to said first transfer device and the second end being connected by an isolator to a second directional optical transfer device, the isolator blocking signals from passing from the first transfer device to the second transfer device;
    a fifth optical fiber connected to said second transfer device, the fifth optical fiber optically communicating with optical carriers to be inserted to said remove and insert system;
    a sixth optical fiber connected to said second transfer device and having a plurality of in-fiber gratings tunable to reflect the optical carriers to be inserted from the fifth optical fiber, the in-fiber gratings positioned to reflect the optical carriers to be inserted through the second directional optical transfer device and through the first optical transfer device to the third optical fiber; and controllers for controlling each of said gratings in said sixth optical fiber.

13. The remove and insert system of claim 12 wherein each of the controllers is a heating element.

14. The remove and insert system of claim 12 wherein each of said in-fiber gratings has a length and each of said controllers mechanically changes the length of a corresponding one of said in-fiber gratings.

15. The remove and insert system of claim 12 wherein each of the first and second directional optical transfer devices is a directional coupler.

16. The remove and insert system of claim 15 further comprising an optical isolator connected to an input side of the first optical fiber.

17. The remove and insert system of claim 12 wherein the in-fiber gratings in the second optical fiber are operable to drop more than one optical carrier at a time when two or more of the in-fiber gratings in the second optical fiber are in a pass through mode.

18. The remove and insert system of claim 17 wherein the in-fiber gratings in the sixth optical fiber are operable to add more than one optical carrier at a time when two or more of the in-fiber gratings in the sixth optical fiber are in a reflection mode.

19. The remove and insert system of claim 12 wherein the in-fiber gratings in the sixth optical fiber are operable to add more than one optical carrier at a time when two or more of the in-fiber gratings in the sixth optical fiber are in a reflection mode.

20. The remove and insert system of claim 12 wherein all of the in-fiber gratings in the second optical fiber are operable to allow pass through of any optical carrier which is to be dropped and wherein the in-fiber gratings in the sixth optical fiber are operable to allow pass through of any optical carrier which is not to be inserted.

\* \* \* \* \*